US012647437B1

(12) United States Patent
Fricano et al.

(10) Patent No.: US 12,647,437 B1
(45) Date of Patent: Jun. 2, 2026

(54) DETECTION OF ANOMALOUS ACTIVITY OF COMPONENTS OF EXTERNAL COMPUTING SYSTEMS

(71) Applicant: Wells Fargo Bank, N.A., San Francisco, CA (US)

(72) Inventors: Daniel Fricano, San Francisco, CA (US); Cheng Tcha Vue, San Francisco, CA (US); Robert I. Kirby, Charlotte, NC (US); Shawn Wallis, Fremont, CA (US); John Finn, Moorsville, NC (US); Shane Dale Cross, Matthews, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 159 days.

(21) Appl. No.: 17/993,482

(22) Filed: Nov. 23, 2022

(51) Int. Cl.
H04L 9/40 (2022.01)

(52) U.S. Cl.
CPC ............................... H04L 63/1425 (2013.01)

(58) Field of Classification Search
CPC ........................ H04L 63/1425; H04L 63/1433
See application file for complete search history.

(56) References Cited

U.S. PATENT DOCUMENTS

| | | | |
|---|---|---|---|
| 7,188,150 | B2 | 3/2007 | Grueneberg et al. |
| 7,769,877 | B2 | 8/2010 | Mcbride et al. |
| 8,171,538 | B2 | 5/2012 | El Husseini et al. |
| 8,608,487 | B2 | 12/2013 | Huie et al. |
| 10,142,364 | B2 | 11/2018 | Baukes et al. |
| 10,282,712 | B2 | 5/2019 | Devan et al. |
| 10,362,117 | B1 | 7/2019 | Nelson |

(Continued)

FOREIGN PATENT DOCUMENTS

| | | |
|---|---|---|
| CN | 102484806 A | 5/2012 |
| CN | 104320297 A | 1/2015 |

(Continued)

OTHER PUBLICATIONS

Opara & Marchewka, "Enterprise Integrated Security Platform: A Comparision of Remote Access And Extranet Virtual Private Networks," Journal of International Technology and Information Management 15(2):3, 11 pages (2016).

*Primary Examiner* — Esther B. Henderson
(74) *Attorney, Agent, or Firm* — Foley & Lardner LLP

(57) ABSTRACT

Systems and methods for monitoring particular communication interfaces linked with external computing systems are provided. The system includes a processing circuit configured to establish a communication interface compatible with a communication protocol of an external computing system. The processing circuit is configured to receive first data identifying a transmission by the communication interface with the external computing system. The processing circuit ingests the first data identifying the transmission based on a parameter to authorize the communication protocol to include second data indicative of the transmission and compatible with the communication protocol. The processing circuit identifies, in response to a determination based on the parameter that the transmission satisfies a threshold corresponding to the parameter, an anomaly state of the transmission by the communication interface. The processing circuit traces, based on the anomaly state, a source of the anomaly state at the external computing system.

20 Claims, 8 Drawing Sheets

(56)  References Cited

U.S. PATENT DOCUMENTS

| | | | |
|---|---|---|---|
| 10,897,472 B1 | 1/2021 | Viglione | |
| 2006/0212407 A1 | 9/2006 | Lyon | |
| 2012/0311691 A1 | 12/2012 | Karlin et al. | |
| 2016/0234232 A1 | 8/2016 | Poder et al. | |
| 2017/0099210 A1 | 4/2017 | Fardid et al. | |
| 2017/0230410 A1* | 8/2017 | Hassanzadeh | G06N 20/00 |
| 2018/0091547 A1 | 3/2018 | St. Pierre | |
| 2018/0316705 A1* | 11/2018 | Tsironis | H04L 41/145 |
| 2019/0020667 A1* | 1/2019 | Parker | H04L 63/107 |
| 2019/0334934 A1* | 10/2019 | Teshome | H04W 12/106 |
| 2020/0067948 A1* | 2/2020 | Baradaran | H04L 63/1441 |
| 2020/0357067 A1 | 11/2020 | Kreider et al. | |
| 2020/0358813 A1 | 11/2020 | Hasumi et al. | |
| 2021/0272066 A1* | 9/2021 | Bratman | G06Q 10/0635 |
| 2022/0239676 A1* | 7/2022 | Demopoulos | H04L 63/1416 |
| 2022/0400400 A1 | 12/2022 | Gloanec et al. | |
| 2023/0007018 A1* | 1/2023 | Levy | H04L 63/0876 |
| 2023/0283629 A1* | 9/2023 | Boyer | H04L 41/16 |
| | | | 726/22 |
| 2024/0015183 A1 | 1/2024 | Bahirat | |

FOREIGN PATENT DOCUMENTS

| | | | |
|---|---|---|---|
| JP | 2007-043483 A | 2/2007 | |
| WO | WO-2018/003919 A1 | 1/2018 | |
| WO | WO-2021/245854 A1 | 12/2021 | |

* cited by examiner

500

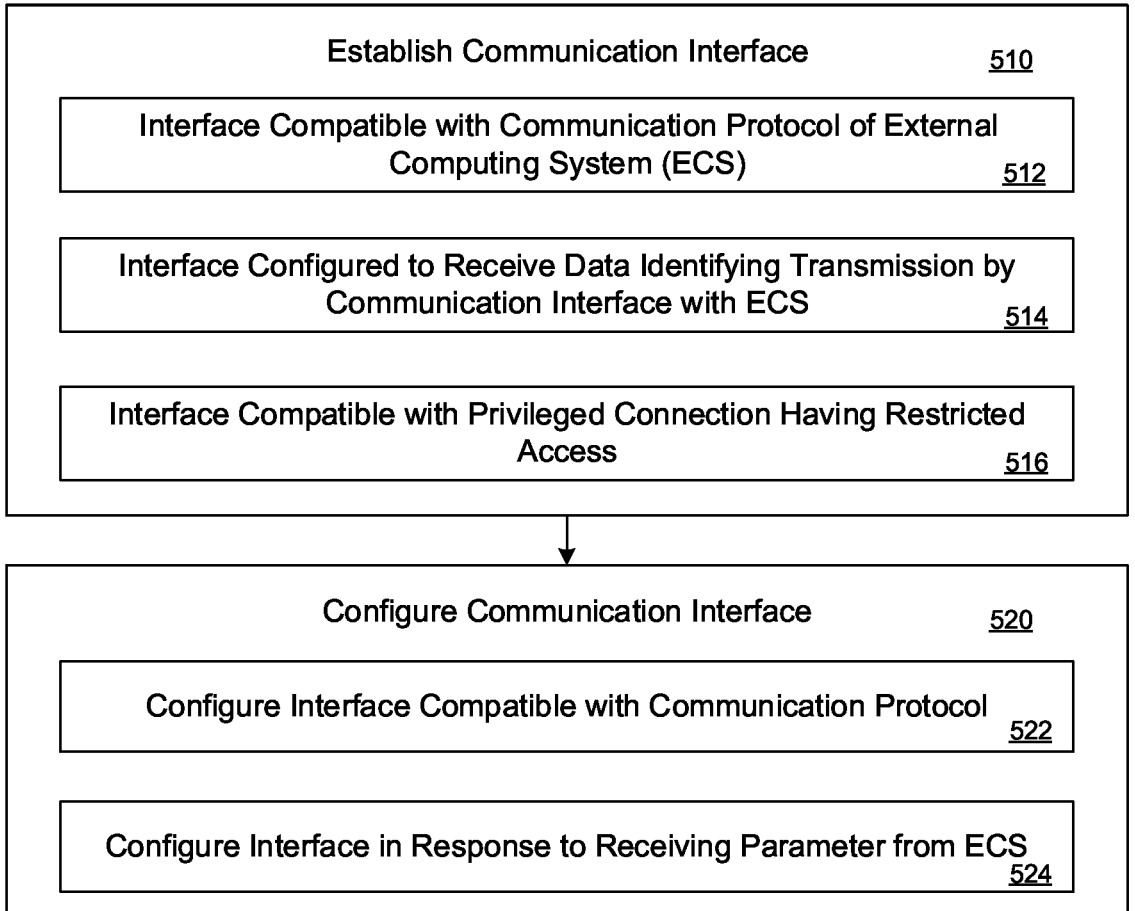

Establish Communication Interface          510

Interface Compatible with Communication Protocol of External Computing System (ECS)          512

Interface Configured to Receive Data Identifying Transmission by Communication Interface with ECS          514

Interface Compatible with Privileged Connection Having Restricted Access          516

Configure Communication Interface          520

Configure Interface Compatible with Communication Protocol          522

Configure Interface in Response to Receiving Parameter from ECS          524

DETECTION OF ANOMALOUS ACTIVITY OF COMPONENTS OF EXTERNAL COMPUTING SYSTEMS

TECHNICAL FIELD

The present disclosure relates generally to computer networks, and more particularly to detection of anomalous activity of components of external computing systems.

INTRODUCTION

People and companies maintain data in computer systems connected to networks, and may provide various third party entities, such as vendors, access to the connected networks to communicate and share data. These data, systems, and networks are prone to various security vulnerabilities, misconfigurations, and partial implementations, which may lead to cybersecurity vulnerabilities or compromises.

SUMMARY

This technical solution can provide input into security vulnerabilities to a particular data plane, such as at least one or more of network, infrastructure, and application-related data, and to particular types of security events associated with the particular data plane. This technical solution can provide a technical improvement including to efficiently identify anomaly states of a data transmission and anomaly states of third party entities or particular components thereof. This summary is illustrative only and is not intended to be in any way limiting.

At least one aspect is directed to a system for monitoring particular communication interfaces linked with external computing systems, the system including memory and one or more processors. The system can establish a communication interface compatible with a communication protocol of an external computing system and configured to receive first data identifying a transmission by the communication interface with the external computing system. The system can ingest the first data identifying the transmission based on a parameter to authorize the communication protocol to include second data indicative of the transmission and compatible with the communication protocol. The system can identify, in response to a determination based on the parameter that the transmission satisfies a threshold corresponding to the parameter, an anomaly state of the transmission by the communication interface. The system can trace, based on the anomaly state, a source of the anomaly state at the external computing system.

At least one aspect is directed to a method for monitoring particular communication interfaces linked with external computing systems. The method can include establishing a communication interface compatible with a communication protocol of an external computing system and configured to receive first data identifying a transmission by the communication interface with the external computing system. The method can further include ingesting the first data identifying the transmission based on a parameter to authorize the communication protocol to include second data indicative of the transmission and compatible with the communication protocol. The method can further include identifying, in response to a determination based on the parameter that the transmission satisfies a threshold corresponding to the parameter, an anomaly state of the transmission by the communication interface. The method can further include tracing, based on the anomaly state, a source of the anomaly state at the external computing system.

At least one aspect is directed to a computer readable medium including one or more instructions stored thereon and executable by a processor to establish a communication interface compatible with a communication protocol of an external computing system and configured to receive first data identifying a transmission by the communication interface with the external computing system. The instructions can include ingesting the first data identifying the transmission based on a parameter to authorize the communication protocol to include second data indicative of the transmission and compatible with the communication protocol. The instructions can include identifying, in response to a determination based on the parameter that the transmission satisfies a threshold corresponding to the parameter, an anomaly state of the transmission by the communication interface. The instructions can include tracing, based on the anomaly state, a source of the anomaly state at the external computing system. The instructions can include correlating at least one of the transmitted first, second, or third data with attributes of the external computing system.

BRIEF DESCRIPTION OF THE DRAWINGS

The disclosure will become more fully understood from the following detailed description, taken in conjunction with the accompanying figures, wherein like reference numerals refer to like elements, in which:

FIG. 5 depicts a first method of detection of anomalous activity of components of external computing systems, according to some arrangements;

Figure 1:
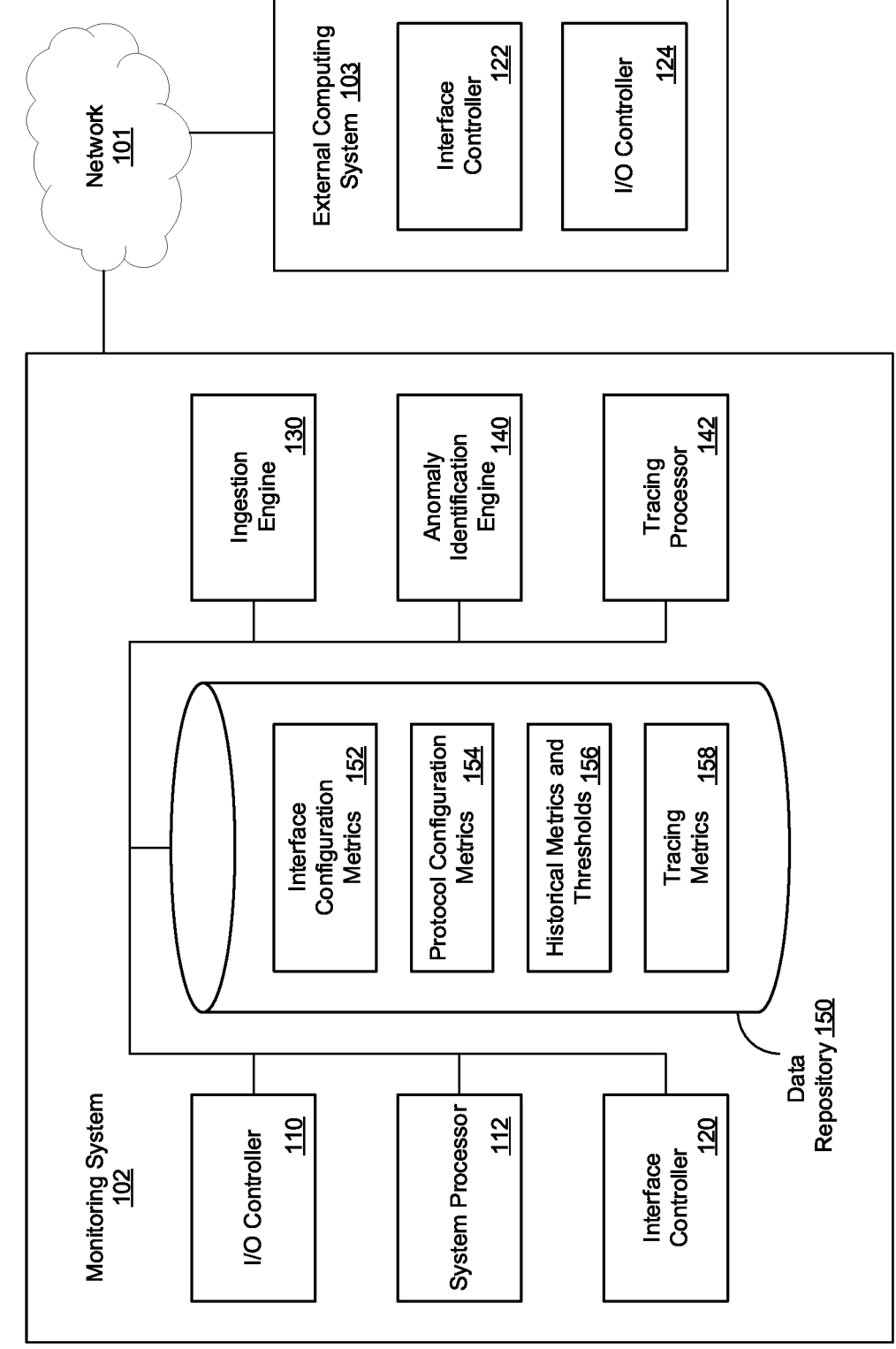
FIG. 1 depicts an example system, according to some arrangements.

It will be recognized that some or all of the figures are schematic representations for purposes of illustration. The figures are provided for the purpose of illustrating one or more implementations and not to limit the scope or the meaning of the claims.

DETAILED DESCRIPTION

Before turning to the figures, which illustrate certain exemplary implementations in detail, it should be understood that the present disclosure is not limited to the details or methodology set forth in the description or illustrated in the figures. It should also be understood that the terminology used herein is for the purpose of description only and should not be regarded as limiting.

The ability to determine the anomaly of data transmission associated with interacting with an entity may provide entities and users (e.g., provider, financial institution, individual, and company) improved cybersecurity, by warning the entities and users of the anomaly of data transmission associated with a potential interaction. Identifying and tracing the anomaly of data transmission can also provide an entity with an analysis of their current cyber infrastructure and can inform the entity of potential improvements (e.g., firewall, data storage method, access, etc.) that may be added or restructured to improve the entity's cyber infrastructure. This approach to identifying and tracing the anomaly of data transmission associated with a third party entity may allow cybersecurity analysis models to provide significant improvements to cybersecurity of third party entities and users by improving network security, infrastructure security, and data security.

Additionally, the ability to avoid and prevent cyber threats, such as hacking activities, data breaches, and cyber-attacks, can, for example, provide entities and users (e.g., provider, financial institution, individual, and company) improved cybersecurity by periodically (e.g., in real time, once a day, once a week, etc.) monitoring third party activity of a computing entity. In particular, periodically monitoring third party activity (e.g., log activity, access to sensitive data, etc.) can improve the protection of an organization's data by correlating the monitored third party activity to an entity profile. The design and execution of cybersecurity models for detecting and addressing cybersecurity vulnerabilities can help to dynamically monitor and discover entity and user relationships (e.g., network relationships, hardware relationships, device relationships and financial relationships) between entities and users. The approach to detecting and monitoring third party activity can allow cybersecurity models to provide significant improvements to cybersecurity of third party entities and users by improving network security, infrastructure security, technology security, and data security. As described herein, the third party can refer to an external computing system that may include, for example, components, processes, devices, or any combination thereof, coupled or integrated with an external computing system.

Further, monitoring third party activity and mapping the activity to specific entity profiles can, for example, provide the technical benefit of detecting and identifying anomalies of data transmission within or performed by particular components of particular external systems, for avoiding and preventing successful hacking activities, successful cyber-attacks, data breaches, and other detrimental cyber-incidents. As described herein, the systems and methods of the present disclosure may include automatically generating and exposing to the affected systems access-controlled activity data. An additional benefit from automatically generating and quantifying cybersecurity activity data and anomalies of data transmission is automated or automatically-assisted triage of weaknesses or unauthorized activity, which optimizes the usage of limited resources to achieve rapid technology risk reduction over a given timeframe and provides an efficient way of automatically monitoring third party activity over a predetermined predefined timeframe.

Further, monitoring extranet activity can include receiving as input records provided by routers (e.g., routers that, for example, can capture and record unique identifiers of the external computing systems), control logs, and data enrichment to document and profile patterns of connection to/from extranet links. Also, the system can institute an automatic process to routinely monitor extranet activity, to reconcile resources against system of records (SOR), and to identify and trace incidents when, for example, anomaly states of transmission by at least one or more of communication interface and anomaly states of the external computing system(s) are discovered.

Entity activity may include encoded information included in network traffic packets and may not be perceptible or easily decodable by a human. Further, even in scenarios where third party entity activity data may be monitored manually, manual tracking and correlating of entity activity can be inaccurate, time consuming and result in incomplete data. Accordingly, the systems and methods described herein provide a technical improvement including an efficient, accurate, and easily accessible third party activity monitoring system and processes mapped to a specific entity profile. Specifically, the computer-based systems and methods described herein are rooted in computer analysis of third party activity data including automatically tracking and correlating activity to an entity profile including a particular computing system, device, or component thereof, which would not be used in tracking third party activity manually as such analysis would be time consuming and ineffective if performed by a human.

Referring now to FIG. 1, a block diagram depicting an example of a system 100 that includes a monitoring system 102 operatively coupled via network 101 to an external computing system 103. The monitoring system 102 can include a data processing apparatus that may further include at least one of an input/output (I/O) controller 110, a system processor 112, an interface controller 120, an ingestion engine 130, an anomaly identification engine 140, and a tracing processor 142. The monitoring system 102 may also include data repository 150 that can further include at least one of interface configuration metrics 152, protocol configuration metrics 154, historical metrics and thresholds 156, and tracing metrics 158. The monitoring system 102 may communicatively and operatively connect by a network 101 with the external computing system 103. The external computing system 103 may include an interface controller 122 and an I/O controller 124.

The network 101 may include the LAN, WAN, a telephone network, such as the Public Switched Telephone Network (PSTN), a wireless link, an intranet, the Internet, or combinations thereof. The network 101 can enable communication between various nodes, such as the monitoring systems 102 and the external computing system 103. For example, data flows through the network 101 from a source node to a destination node as a flow of data packets. The network 101 may include various network devices (nodes) communicatively linked to form one or more data communication paths between participating devices. Each networked device includes at least one network interface for at least one or more of receiving and transmitting data, typically as one or more data packets. An illustrative network 101 is the Internet; however, other networks may be used. The network 101 may be an autonomous system (AS), i.e., a network that is operated under a consistent unified routing policy (or at least appears to from outside the AS network) and is generally managed by a single administrative entity (e.g., a system operator, administrator, or administrative group).

The network 101 may include multiple connected sub-networks or AS networks, which may meet at least one or more of one or more of: an intervening network (a transit network), a dual-homed gateway node, a point of presence (POP), an Internet exchange Point (IXP), and additional other network boundaries. The network 101 can be the LAN, such as a company intranet, a metropolitan area network (MAN), the WAN, an inter network such as the Internet, or a peer-to-peer network, e.g., an ad hoc Wi-Fi peer-to-peer network. The data links between nodes in the network 101 may be any combination of at least one or more of physical links and wireless links. The network 101 may include carrier networks for mobile communication devices, e.g., networks implementing wireless communication protocols. The network 101 can include short-range wireless links, sometimes referred to as a personal area network (PAN) or mesh network. The network 101 may be public, private, or a combination of public and private networks. The network 101 may be any type and form of at least one or more of data network and communication network.

The monitoring system 102 may be used by institutions to assess and manage multidimensional cybersecurity schemas and information (e.g., perimeter, technology, intelligence, and security controls) relating to various entities. The assessment can be accomplished using various components of the monitoring system 102 as described further herein.

The external computing system 103 can correspond to the "third party" that is, for example, an entity external to an organization. The third party entity may be a user, customer, financial organization, or the like. For example, a third party may be a known entity, such as a business partner entity (e.g., vendor, supplier, collaborator, etc.). The network 101 may be used to electronically transmit data bidirectionally or unidirectionally with the processors, controllers, and engines (e.g., the system processor 112, the interface controller 120, the ingestion engine 130, etc.) of the monitoring system 102. The external computing system 103 may initiate and route (e.g., provide) third party activity data, which may include device connectivity data, log data, IP traffic data, and other types of data, such as additional intelligence data that one or more components of the monitoring system 102 can track, monitor, correlate, and store third party activity data in the data repository 150.

The I/O controller 110 can communicate with one or more external systems via the network 101 and can obtain one or more data packets via the network 101. The I/O controller 110 can obtain or generate data packets based on one or more output criteria that can be transmitted to a computing device, including, for example, the external computing system 103. The I/O controller 110 can identify one or more characteristics of a data packet. A characteristic can include, for example, a data type, an output data type, an input data type, or any combination thereof. For example, the I/O controller 110 can obtain and identify data packets including video, audio, text, any media, executable programs, or any combination thereof. The I/O controller 110 can transmit one or more of data packets or references or links with one or more data packets to the interface controller 120 that electrically and/or communicatively coupled to the system processor 112.

The I/O controller 110 of the monitoring system 102 can interface with at least one or more applications, ports, components of the external computing system 103. The I/O controller 110 of the monitoring system 102 can support expanded or customized communication interfaces that provide a higher level of granularity than a generic interface. The monitoring system 102 may, for example, transmit a request for authorization to activate a communication interface with the external computing system 103 that includes a particular restricted access point or restricted portion for an interface. For example, a restricted access point or portion of an interface can include one or more ports, terminals, frequencies, channels, or the like that can be restricted to transmission by the restricted interface or portion thereof. For example, a restricted access point can include a port or range of ports restricted to diagnostic output or input of the external computing system 103 or any component thereof.

The system processor 112 can execute one or more instructions associated with the monitoring system 102. The system processor 112 can include an electronic processor, an integrated circuit, or the like that can further include one or more of digital logic, analog logic, digital sensors, analog sensors, communication buses, volatile memory, nonvolatile memory, and the like. The system processor 112 can include, but is not limited to, at least one microcontroller unit (MCU), microprocessor unit (MPU), central processing unit (CPU), graphics processing unit (GPU), physics processing unit (PPU), embedded controller (EC), or the like. The system processor 112 can include a memory operable to store or storing one or more instructions for operating components of the system processor 112 and operating components operably coupled to the system processor 112. The one or more instructions can include at least one of firmware, software, hardware, operating systems, embedded operating systems, and the like. The system processor 112 of the monitoring system 102 generally can include at least one communication bus controller to effect communication between the system processor 112 and the other elements of the monitoring system 102.

A reference is now made to the interface controllers 120, 122. The interface controller 120 can link the monitoring system 102 with one or more of the network 101 and the external computing system 103 by one or more communication interfaces. A communication interface can include, for example, an application programming interface ("API") compatible with a particular component of the monitoring system 102. The communication interface can provide a particular communication protocol compatible with a particular component of the external computing system 103. The communication protocol configuration is stored in the protocol configuration metrics 154 of the data repository 150. The interface controller 120 can be compatible with particular data packets and particular data delivery systems corresponding to particular data packets. For example, the interface controller 120 can be compatible with transmission of text, video content, audio content, or any combination thereof. For example, the interface controller 120 can be compatible with payment processing transmissions by a protocol compatible with payment processing latency and encryption structures. The data repository 150 may include at least one of an access control list, an access template, or a look-up table. The interface controller 120 can establish a perimeter boundary control based on HR logs, firewall logs, network address translation (NAT) tables, lookup tables, and the like.

The interface controller 120, 122 supports wired or wireless network connections and an interface in a wireless (e.g., radio) receiver/transmitter. In various arrangements, the network interface controller 120, 122 implements one or more network protocols. Generally, the system 100 and the components as shown in FIG. 1 can be configured to exchange data with other computing devices via physical or wireless links through a network interface. The network interface may link directly to another device or to another device via an intermediary device, e.g., a network device such as a hub, a bridge, a switch, or a router, coupling the interface controllers 120, 122 and the network 101. In example arrangements, the data from the monitoring system 302, 402 in FIGS. 3, 4, respectively, is routed through the network switch 378, 478, respectively.

The interface controller 120 of the monitoring system 102 can interface with at least one or more applications, ports, components of the external computing system 103. The interface controller 120 of the monitoring system 102 can support expanded or customized APIs or communication interfaces that provide a higher level of granularity than a generic interface. The monitoring system 102 may, for example, transmit a request for authorization to activate a communication interface with the external computing system 103 that includes a particular restricted interface or restricted portion for an interface. For example, a restricted interface or portion thereof can include one or more restricted metrics that can be restricted to transmission by the restricted interface or portion thereof. For example, a restricted metric can include indications of status of one or more components communicating via the communication interface, or a state of a communication property of the communication interface.

The interface controller 122 can have one or more of structure and operation at least partially corresponding to or at least partially compatible with the interface controller 120. The interface controller 122 of the external computing system 103 can link the external computing system 103 with one or more of the network 101 and the monitoring system 102 by one or more communication interfaces. A communication interface can include, for example, at least one or more of an API compatible with a particular component of the monitoring system 102 and the external computing system 103. The communication interface can provide a particular communication protocol compatible with a particular component of the monitoring system 102 and a particular component of the client system 103. The interface controller 122 can be compatible with particular data packets and can be compatible with particular data delivery systems corresponding to particular data packets. For example, the interface controller 122 can be compatible with transmission of text, video content, audio content, or any combination thereof. For example, the interface controller 122 can be compatible with payment processing transmissions by a protocol compatible with payment processing latency and encryption structures. The communication interface of the client system 103 can be compatible with the communication interface of the monitoring system 102 to perform unidirectional or bidirectional communication between the interface controllers 120 and 122.

The ingestion engine 130 can receive the connectivity data in real-time such that one or more components of the monitoring system 102 can monitor the data in real-time. In various arrangements, the ingestion engine 130 may receive the connectivity data in periodic increments such that one or more components of the monitoring system 102 can monitor and correlate the data associated with the specific entity periodically (e.g., every second, every minute, every hour, every day, every week). The ingestion engine 130 can extract the third party activity data from components, applications, interfaces, or any combination thereof, of the external computing system 103. The ingestion engine 130 can determine, based on the extracted third party activity data, a computing entity external to the monitoring system 102. For example, based on the extracted connectivity data, the ingestion engine 130 can determine a corresponding third party entity associated with the third party activity data (e.g., a corresponding vendor, company, or other third party entity associated with the extracted connectivity data).

Generally, the ingestion engine 130 can enable the monitoring system 102 to ingest and monitor third party activity data and trace a route taken by a particular unit of information (e.g., from an external device to a destination computing system). The third party activity data (such as, for example, a particular system identifier) may include any items extracted from at least one or more of the header, footer, metadata, and payload portions of the data or traffic packets transmitted by the external computing systems 103 over the network 101. The third party activity data may be used to identify a particular external computing system 103. For example, a particular system identifier may include all or a portion of a cookie, a unique code, a public/private key, a user name, an active directory handle, a social media handle, an email address, a financial account identifier, an IP address, a MAC address, a VLAN identifier, domain, subdomain, bytes in, bytes out, a clear-text message, an email message, an image, a graphic, a video, an interface message, a source email address, a recipient email address, a timestamp, a file name, a file extension, or any other suitable information indicative of activity on a computing system, or another suitable identifier. The third party activity data may be used to identify a particular user associated with the external computing system 103. The third party activity data may be used to identify specific actions executed by the external computing system 103 automatically or by the particular user(s).

The ingestion engine 130 can receive data in real-time such that one or more components of the monitoring system 102 can monitor the data in real-time. In various arrangements, the ingestion engine 130 may receive the connectivity data in periodic increments such that one or more components of the monitoring system 102 can monitor and correlate the data associated with the specific entity periodically (e.g., every second, every minute, every hour, every day, every week). For example, the ingestion engine 130 can extract the third party activity data from the external computing system 103. The ingestion engine 130 can determine, based on the extracted third party activity data, a computing entity external to the monitoring system 102. For example, based on the extracted connectivity data, the ingestion engine 130 can determine a corresponding third party entity associated with the third party activity data (e.g., a corresponding vendor, company, or other third party entity associated with the extracted connectivity data).

Various properties or attributes (e.g., records, delimited values, values that follow particular pre-determined character-based labels) can be extracted from the third party activity data sent by the external computing systems 103 described herein. For example, the properties or attributes can include at least one or more of device-related data and IP traffic data. Device-related data can encompass data related to at least one or more of software, firmware, and hardware technology deployed to, included in, or coupled to a particular device. Device-related data can also include IP address(es), software information, operating system information, component designation (e.g., router, web server), version information, port number(s), timestamp data, host name, etc. IP traffic data can include items included in packets, as described elsewhere herein. Further, IP traffic data included in the third party activity data can include various supplemental information (e.g., For example, metadata associated with packets), such as host name, organization, Internet Service Provider (ISP) information, country, city, communication protocol information, and Autonomous System Number (ASN) or similar identifier for a group of devices using a particular defined external routing policy. For example, third party activity data can be determined at least in part based on banner data exposed by the respective source entity, for example, by the external computing system 103. For example, third party activity data can comprise metadata about software running on a particular device of a source entity.

Figure 4:
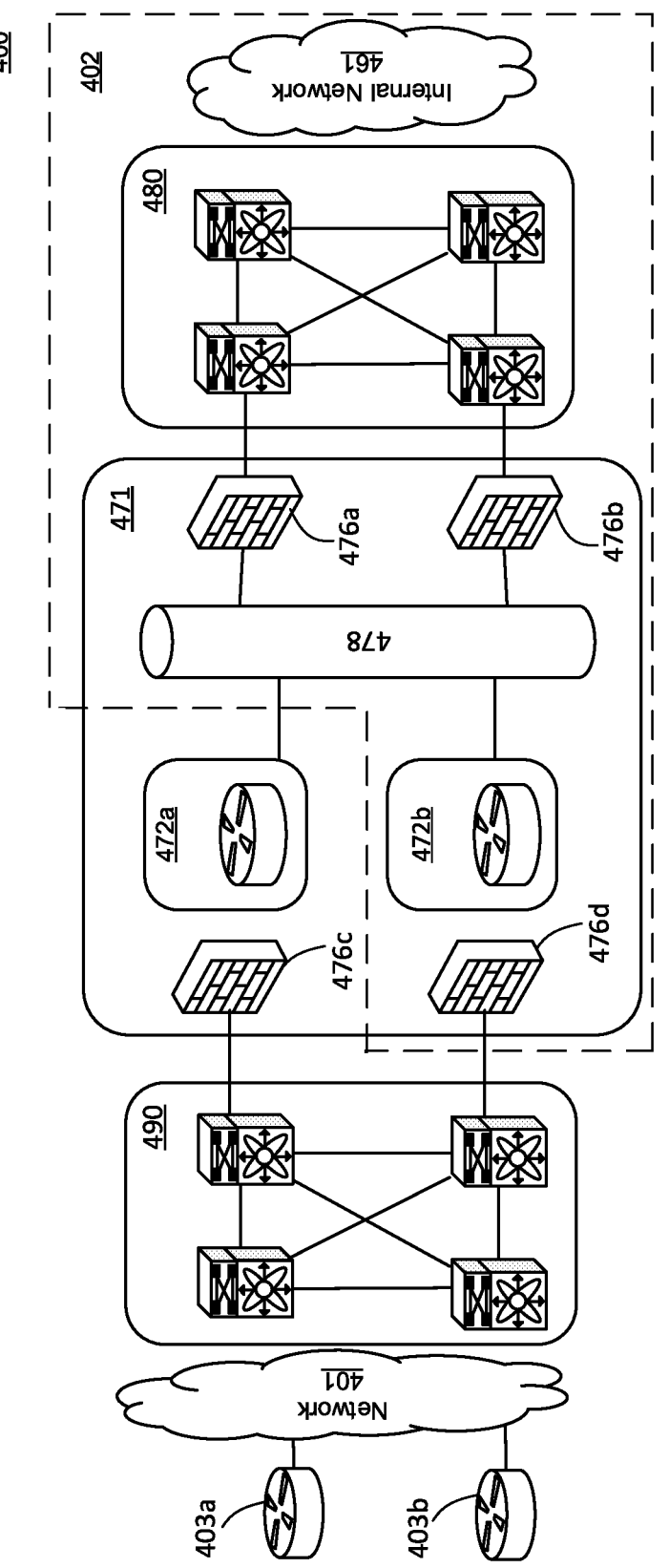
FIG. 4 depicts a third example computing environment, according to some arrangements.

By way of non-limiting example, the organization associated with the organization devices and the organization internal network 461 (FIG. 4) may be a financial institution and a third party entity may be an individual employee of a vendor (e.g., a business consulting firm) of the financial institution that has access to an extranet provided by the financial institution. The third party entity may spend, for example, three hours a day entering data into a provided extranet through the organization internal network 461 (FIG. 4). A ransomware attack may occur through a VPN associated with the third party entity through the organization internal network 461 (FIG. 4). The ingestion engine 130 can receive, through one or more components of monitoring system 102 (for example, the interface controller 120), the third party activity data associated with the third party entity, such as which employees of the third party entity have access to the VPN, who is accessing tools of the VPN and various other similar behaviors. The ingestion engine 130 can extract the connectivity data and determine, based on the extracted data, a corresponding computing device (e.g., the external computing system 103) associated with a third party entity (e.g., such as at least one or more of the vendor company and an individual employee). In various arrangements, the ingestion engine 130 can determine an associated computing device through a plurality of ways including the associated IP domain information received from each external computing system 103 described herein or an associated unique identifier associated with the third party activity data (e.g., a cookie, unique code, IP address, etc.) As described in greater detail below, one or more components of the monitoring system 102 may further be configured to monitor such activity and correlate the activity to an entity profile to automatically store and generate the entity profile to a user of the monitoring system 102. For example, one or more components of the monitoring system 102 described herein can detect anomalies for data transmission, specific applications, services, daemons or other background services, interfaces, communication channels, or the like, of the external computing system 103.

The ingestion engine 130 can receive third party activity data from a source (e.g., from one or more external computing system 103). For example, the ingestion engine 130 can receive, store, and access in the data repository 150 interface configuration data, for example, third party activity data including, but not limited to, at least one or more of web or proxy data, email data, endpoint data, VPN data, firewall data, and extranet data from one or more external computing systems 103. The interface configuration data can be stored in, for example, the interface configuration metrics 152. The proxy data may include web requests, Internet activity, or the like from one or more servers (e.g., such as a proxy server). The email data may include sent or transmitted email activity of a user (e.g., email sent to/from an external computing system 103, via the network 101) from one or more servers (e.g., such as an email server). The endpoint data may include various third party activity from an endpoint of the network 101 including activity of the external computing system 103 (e.g., at least one or more of laptops, desktops, mobile phones, tablets, servers, and virtual environments) from one or more servers (e.g., such as an endpoint). The VPN data may include data from a VPN of a third party using one of the external computing systems 103, such as a VPN traffic between one or more entity devices and the network 101 through one or more servers (e.g., such as a network server). The firewall data may include any data corresponding to a firewall monitoring and controlling incoming and outgoing network 101 traffic to or from one or more of the entity devices from one or more servers (e.g., from firewall servers 376, 476 shown in FIGS. 3-4 and discussed below). The extranet data may include any third party activity corresponding to traffic of one or more extranets provided by the organization (e.g., the financial institution, via, for example, the organization devices) from one or more servers (e.g., from an extranet server).

The ingestion engine 130 may include one or more systems (e.g., computer-readable instructions executable by a processor) and circuits (e.g., ASICs, Processor Memory combinations, logic circuits) configured to perform various functions of the ingestion engine 130. The ingestion engine 130 can be run or otherwise be executed on one or more processors of a computing device, such as those described herein. The monitoring system 102 may include a bus or other communication component for communicating information and a processor coupled to the bus for processing information. The monitoring system 102 may also include main memory, such as a random-access memory (RAM) or other dynamic storage device, coupled to the bus for storing information, and instructions to be executed by the processor. Main memory can also be used for storing position information, temporary variables, or other intermediate information during execution of instructions by the processor. The monitoring system 102 may further include a read only memory (ROM) or other static storage device coupled to the bus for storing static information and instructions for at least one of the processors of the monitoring system 102. A storage device, such as a solid-state device, magnetic disk or optical disk, is coupled to the bus for persistently storing information and instructions.

The anomaly identification engine 140 can determine that activity of the external system 103 or any component thereof corresponds to an anomaly state. The anomaly state may identify cyber-incidents, security breaches, cybersecurity structure types, analyses of the entity cyber-infrastructure, and the like. The anomaly identification engine 140 can analyze the cyber-infrastructure of an entity to determine any weaknesses or potential for cyber-incidents, in accordance with a machine learning model that receives as input data from the ingestion engine 130. The monitoring system 102 may further include the data repository 150 to which additional information or analyses may be added. The entity profile(s) are configured to store information corresponding to an entity. The entity profile(s) may be predetermined or prebuilt to include information corresponding to an entity (e.g., size, location, history, employee information, etc.). The entity profile(s) may be systems configured to access entity information from a plurality of sources (e.g., consulting firms, analysis firms, articles, etc.) that may have pre-analyzed or pre-determined information pertaining to an entity. The anomaly identification engine 140 may identify the anomalies of data transmission, specific applications, services, daemons or other background services, interfaces, communication channels, or the like, of the external computing system 103. The detected anomaly can be specific to a particular system (e.g., a particular vendor server, for example, a server of the third party providing trading information or government entity that, for example, provides an interest rate) or a particular component (e.g., a particular application, service, or port of the external computing system 103, for example, the SMTP port).

The anomaly state can be based on data volume predetermined by at least one of a type of at least one of the transmitted first, second, or third data or a service agreement established with an entity managing the external computing system. The anomaly state of at least one of the transmitted first, second, or third data is based on at least one of historical first, second, or third data transmitted between the entity and the external computing system. The identification of the anomaly state further comprises correlation of at least one of the transmitted first, second, or third data with attributes of the external computing system.

The monitoring system 102 can include at least one or more of hardware, software, and circuitry structured to perform computer-executable operations identifying and tracing data provided by the third party entity. The input/output controller 110 is structured to receive communication from and provide communications to a user. For example, the input/output controller 110 may facilitate inputting information (related to, e.g., interface or protocol configurations) by a user or inputting additional entity data. The system processor 112 may be implemented as a general-purpose processor, an application specific integrated circuit (ASIC), one or more field programmable gate arrays (FPGAs), a digital signal processor (DSP), a group of processing components, or other suitable electronic processing components. A memory may be or include at least one or more of tangible, non-transient volatile memory and non-volatile memory.

The data repository 150 can be a system of records (SOR) or a monitoring system of records (SSoR) external to the monitoring system 102. For example, the SOR can maintain records or data relating to the monitoring system 102. The SOR may include a microservice backend communicatively coupled to the data repository 150 or other data structure. The microservice backend can ingest, analyze, process, or otherwise extract data received via the ingestion engine 130. The SOR may include a plurality of data points associated with a plurality of third party entities. For example, the SOR may include various entity profiles of various third party entities including the logged third party activity data for each entity. The microservice backend can populate the data repository 150 with data for each entity profile (such as data relating connectivity data). The ingestion engine 130, the network 101, and the data repository 150 can include at least one or more of hardware, software and circuit that originates, generates, or routes entity data to the monitoring system 102. The ingestion engine 130, the network 101, and the data repository 150 can receive information from the external computing system 103, such as the parameter, group information, etc.

The data repository 150 can store data associated with the system 100. The data repository 150 can include one or more hardware memory devices to store binary data, digital data, or the like. The data repository 150 can include one or more electrical components, electronic components, programmable electronic components, reprogrammable electronic components, integrated circuits, semiconductor devices, flip flops, arithmetic units, or the like. The data repository 150 can include at least one of a non-volatile memory device, a solid-state memory device, a flash memory device, and a NAND memory device. The data repository 150 can include one or more addressable memory regions disposed on one or more physical memory arrays. A physical memory array can include a NAND gate array disposed on, for example, at least one of a particular semiconductor device, integrated circuit device, and printed circuit board device. The data repository 150 can include the interface configuration metrics 152 (for storing, e.g., interface configuration data), the protocol configuration metrics 154 (for storing, e.g., protocol configuration data), the historical metrics and thresholds 156 (for storing, e.g., historical data), and the tracing metrics 158 (for storing, e.g., tracing data).

The various components and example systems of the monitoring system 102 are configured to store or access the data repository 150 that includes information corresponding to predetermined parameters for certain types of data, events, and weights associated with certain types of data or events. For example, the data may contain information pertaining to predetermined parameters corresponding to certain types of cyber-incidents. The predetermined parameters may be determined by users of the monitoring system 102 and established by the anomaly identification engine 140 based on, for example, data in the historical metrics and thresholds 156 or, for example, determined by the AI processes described herein. The monitoring system 102 can host a cybersecurity correlation and analytics (CSCA) computing system. Generally, in such arrangements, the monitoring systems 102 may include circuitry that enable computer-based operations for cybersecurity correlation and analytics, including, for example, ingestion of log data for various monitoring systems, determining various third party activity data items based on the log data, and streaming log data externally.

Although shown in the arrangements of FIG. 1 as singular, stand-alone device, one of ordinary skill in the art will be appreciate that, The monitoring system 102 may comprise at least one or more of virtualized systems and system resources. For example, the monitoring system 102 may be a virtual switch, virtual router, virtual host, or virtual server. In various arrangements, monitoring system 102 may share physical storage, hardware, and other resources with other virtual machines. For example, virtual resources of the networks 101, 361 (e.g., external network 101 of FIG. 1 or internal network 361 of FIGS. 3-4) may include cloud computing resources such that a virtual resource may rely on distributed processing across more than one physical processor, distributed memory, etc.

Further with respect to the components of FIG. 1, an anomaly identification engine 140 can identify an anomaly in the third party activity of the computing entity (e.g., external computing system 103). The anomaly identification engine 140 may include at least one or more of systems (e.g., computer-readable instructions executable by a processor) and circuits (e.g., ASICs, Processor Memory combinations, logic circuits) configured to perform various functions of the anomaly identification engine 140. The anomaly identification engine 140 can be run or otherwise be executed on one or more processors of the monitoring system 102, such as those described above. The anomaly identification engine 140 can monitor the connectivity data in real-time or in increments (e.g., every second, every minute, every hour, every day, every week). Monitoring the connectivity data in real-time or in increments as described herein may provide various improvements over existing systems. For example, if the connectivity data were monitored by a human, it would typically take multiple people to monitor a single individual or entity. Further, it would typically take significantly longer to correlate each activity of an individual to a particular third party entity and store the data in an entity profile. Even existing computer-based systems typically do not continuously monitor, correlate, and store such third party activity, as most existing systems may take weeks or months to monitor and correlate the data to an entity. However, the present solution provides an institution access to each and every third party activity of the network 101 in real-time (e.g., run-time) or in short increments (e.g., daily, weekly).

This improves the functioning of computing devices by providing immediate and accurate access to all third party entity data to easily track and stop a cyber-attack.

The anomaly identification engine 140 is configured to receive third party entity data or data corresponding to a third party entity from at least one external computing system 103. For example, the anomaly identification engine 140 can receive data including, but not limited to, at least one or more of cyber infrastructure data, third party entity information, expert analyses, firewall data, access profiles, and extranet data from at least one external computing system 103. Such data can be stored in at least one of the interface configuration metrics 152, the historical metrics and thresholds 156, and tracing metrics 158. The cyber infrastructure data may include data describing the structure of a third party entity's cyber infrastructure received from at least one external computing system 103. The third party entity information may include information (e.g., third party entity size, employee count, financial information, etc.) pertaining to a third party entity from an entity profile. The expert analyses may include scores or analyses pertaining to an entity from subject matter experts, as received from the expert data source(s). The firewall data may include any data corresponding to a firewall monitoring and controlling at least one or more of incoming and outgoing network traffic to or from one or more third party entities. The access profiles may include a listing of who can access the extranet of the institution controlling the monitoring system 102 and how much of the internal data of the institution controlling the monitoring system 102 a user of the third party may access. Extranet data may include any third party entity activity corresponding to traffic of one or more extranets provided by the institution controlling the monitoring system 102.

The anomaly identification engine 140 can transform the monitored third party activity to a third party entity profile. For example, the anomaly identification engine 140 can generate, based on each third party activity, an individual third party entity profile (e.g., an individual or a vendor company) stored in the data repository 150, for example in the interface configuration metrics 152. The data repository 150 may be a component of the monitoring system 102. The third party entity profiles can be further divided into third party entity specific organization and categories (e.g., line-of-business, subsidiary, department, location).

Further with respect to the components of FIG. 1, a tracing processor 142 can trace an anomaly state of the data transmission by communication interface (e.g., by the interface controller 120) based on the individual third party entity profile, and generate a report including the detailed third party activity correlated to the individual third party entity profile. The tracing processor 142 may include at least one or more of systems (e.g., computer-readable instructions executable by a processor) and circuits (e.g., ASICs, Processor Memory combinations, logic circuits) configured to perform various functions of the tracing processor 142. The tracing processor 142 can be run or otherwise be executed on one or more processors of a computing device, such as those described above.

In various arrangements, the tracing processor 142 can provide at least one or more of notifications, messages, and mass data packets to the users of the monitoring system 102 based on the activity data correlated with the third party entity. For example, the tracing processor 142 can access one or more entity profiles and transmit the one or more entity profiles to at least one or more of the historical metrics and thresholds 156 and the tracing metrics 158 of the data repository 150. In some arrangement, the report may include a detailed report of the third party entity profiles including at least one or more of each logged third party activity data, remediation items, historical data, and trends in the data. The detailed report can contain various data based on the analyses performed by the one or more processing circuits of the tracing processor 142. The detailed report can include at least one or more of cybersecurity risks (e.g., risks related to intelligence, perimeter, technology, security controls determined by a risk-scoring process), multi-dimensional scores of these risks, remediation items, remediation actions, security reports, data analytics, graphs, charts, historical data, historical trends, vulnerabilities, summaries, help information, domain information, subdomain information, and any other properties or attributes extracted from third party activity data, IP traffic data, etc. In various arrangements, the detailed report may be presented on a computer device (e.g., mobile phone screen, monitor, display, smart watch, or smart device). The information can be grouped, filtered and sorted via various characteristics, including line-of-business, relationship-type, business function, criticality, geographic footprint, and relationship-owner, as stored in each third party entity profile.

The memory and one or more processors can be configured, in response to receiving the parameter from the external computing system, to configure the communication interface to be compatible with the communication protocol. The memory and one or more processors are configured, in response to authorization by the external computing system to transmit the first data identifying the transmission, to ingest third data compatible with the parameter. The communication interface can be compatible with a privileged connection having a restricted access. The parameter is established based on verifying a unique identifier, the unique identifier comprising at least one of the internet protocol (IP) information, a domain name, application, service, daemon, or circuit identification (ID) of the external computing system. The unique identifier is compatible with at least one of a database of the monitoring system, firewall policy, or router interface.

Figure 2:
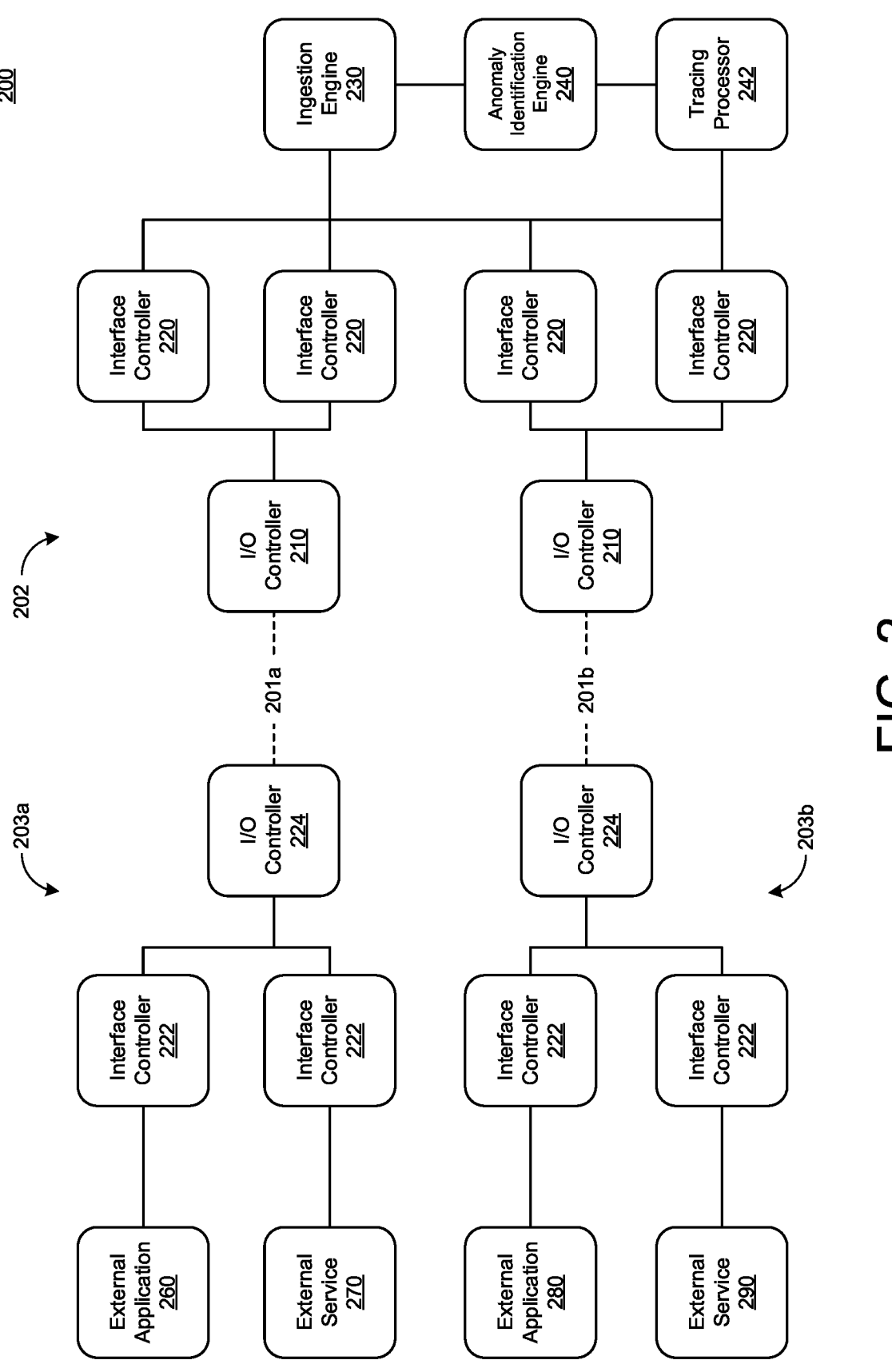
FIG. 2 depicts a first example computing environment in a computing environment, according to some arrangements.

A reference is now made to FIG. 2 that illustrates a block diagram depicting a monitoring system 202 in a computing environment 200. FIG. 2 provides a more detailed view of certain components of the monitoring system 202, according to one arrangement of the present disclosure. The monitoring system 202 may be identical to or similar in some respect to the monitoring system 102 of FIG. 1. Accordingly, like features may be designated with like reference numerals, with the leading digits incremented to "2". Relevant disclosure set forth above regarding similarly identified features thus may not be repeated hereafter. Moreover, specific features of the monitoring system 202 may not be shown or identified by a reference numeral in the drawings or specifically discussed in the written description that follows. However, such features may clearly be the same, or substantially the same, as features depicted in some implementations or described with respect to such implementations. Accordingly, the relevant descriptions of such features apply equally to the features of the monitoring system 202. Any suitable combination of the features and variations of the same described with respect to the monitoring system 102 can be employed with the monitoring system 202, and vice versa. This pattern of disclosure applies equally to further arrangements depicted in subsequent figures and described hereafter.

The environment 200 can include the monitoring system 202, the external computing system 203*a*, and a second external computing system 203b. The environment 200 is not limited to any particular number of external computing systems or components as illustrated by way of example. The external computing system 203a can include an external application 260 and an external service 270. The second external computing system 203b can include an external application 280 and an external service 290. The monitoring system 202 can be coupled with the external computing system 203 by the network connection 201a. The monitoring system 202 can be coupled with the second external computing system 203b by the network connection 201b.

In various arrangements, the entity that owns or controls the monitoring system 202 can use the systems and methods of the present disclosure to monitor external computing systems 203a and 203b (that each includes, for example, the I/O controller 222 and the interface controller 224). The monitoring system 202 may include circuitry that enables computer-based operations for cybersecurity correlation and analytics, including, for example, ingestion of log data for various external computing systems 203a and 203b, determining various third party activity data items based on the log data, and streaming the log data to the anomaly identification engine 240.

The third party data is made available to the monitoring system 202 via the networks 201a and 201b. To that end, I/O controllers 210 can be used access to various components of the monitoring system 202 (for example, an ingestion engine 230, an anomaly identification engine 240, and a tracing processor 242) and the networks 201a and 201b (e.g., using an Internet browser), cybersecurity risk profiles, and user-interactive graphical interface controllers 220, that may include or be, for example, security dashboards, or to receive any other type of data. In one example, a user associated with the organization I/O controller 210 of the institution (e.g., the institution that owns or controls the monitoring system 202) can perform and execute instructions on the monitoring system 202. The network connections 201a and 201b can be configured to be compatible with the LAN such as a company intranet, WAN, a telephone network, such as the PSTN, a wireless link, an inter network such as an intranet, the Internet, or combinations thereof. The networks 201a and 201b may include multiple connected sub-networks or AS networks, which may meet at least one or more of one or more of: an intervening network (a transit network), a dual-homed gateway node, a POP, an IXP, and additional other network boundaries. The networks 201a and 201b can be the MAN, or a peer-to-peer network, e.g., an ad hoc Wi-Fi peer-to-peer network. The data links between nodes in the networks 201a and 201b may be any combination of at least one or more of physical links (e.g., fiber optic, mesh, coaxial, twisted-pair such as Cat-5 or Cat-6, etc.) and wireless links (e.g., radio, satellite, microwave, etc.). The networks 201a and 201b may include carrier networks for mobile communication devices, e.g., networks implementing wireless communication protocols.

For example, networks 201a and 201b can provide data, e.g., values, types of structure, events, descriptors, and/or other features from entity data from the external computing systems 203a and 203b. The networks 201a and 201b can facilitate the ingestion engine 230 to separate (i) first data that identifies the transmission by the communication interface with the external computing systems 203a and 203b (for example, the token ID identifying the transmitted data), (ii) second data providing indication of the transmission and compatible with the communication protocol (for example, data identifying the type or time of the transmitted data), and (iii) the data compatible with a parameter to authorize the communication protocol (e.g., metadata or log data that may be customized based on the interface configuration metrics 152 (FIG. 1)). For example, the network connections 201a and 201b can be customized or extended to provide metadata specific to the particular application and service. Such metadata can be data compatible with the parameter to authorize the communication protocol. For example, third party entity data may comprise firewall structure data and firewall breach data, the networks 201a and 201b can facilitate the ingestion engine 230 to separate the firewall structure data and the firewall breach data so that the anomaly engine 240 can further analyze such different categories of third party data to identify anomaly in the data transmission or anomaly in the third party entity behavior. The networks 201a and 201b transmit additional third party data in real time or periodically.

A more detailed reference is now made to external applications 260, 280 and the external services 270, 290 of the external computing systems 203a, 203b, respectively. The external application 260 and the external service 270 of the external computing system 203a can be distinct from each other and from the external application 280 and the external service 290. For example, each of the external applications 260, 280 and the external services 270, 290 can have their own distinct communication interfaces, connections, protocols, and the like. For example, the external application 260, 280 can be a web site application or an API application, whereas the external service 270, 290 can be a daemon or other lower-level or background process. The external applications 260, 280 and the external services 270, 290 can be independent or interdependent from each other. For example, the external application 260 can be dependent on the external service 290 but independent from the external application 280 and the external service 270.

For example, each of the external applications 260, 280 and the external services 270, 290 can be connected to the interface controllers 222 of the external computing systems 203a, 203b. The interface controller 222 can be customized to the specific external application 260, 280 or the external service 270, 290. For example, if the external application 260 is a web site application, the interface controller 222 of the external computing system 203a can be customized for that specific web site application.

Figure 3:
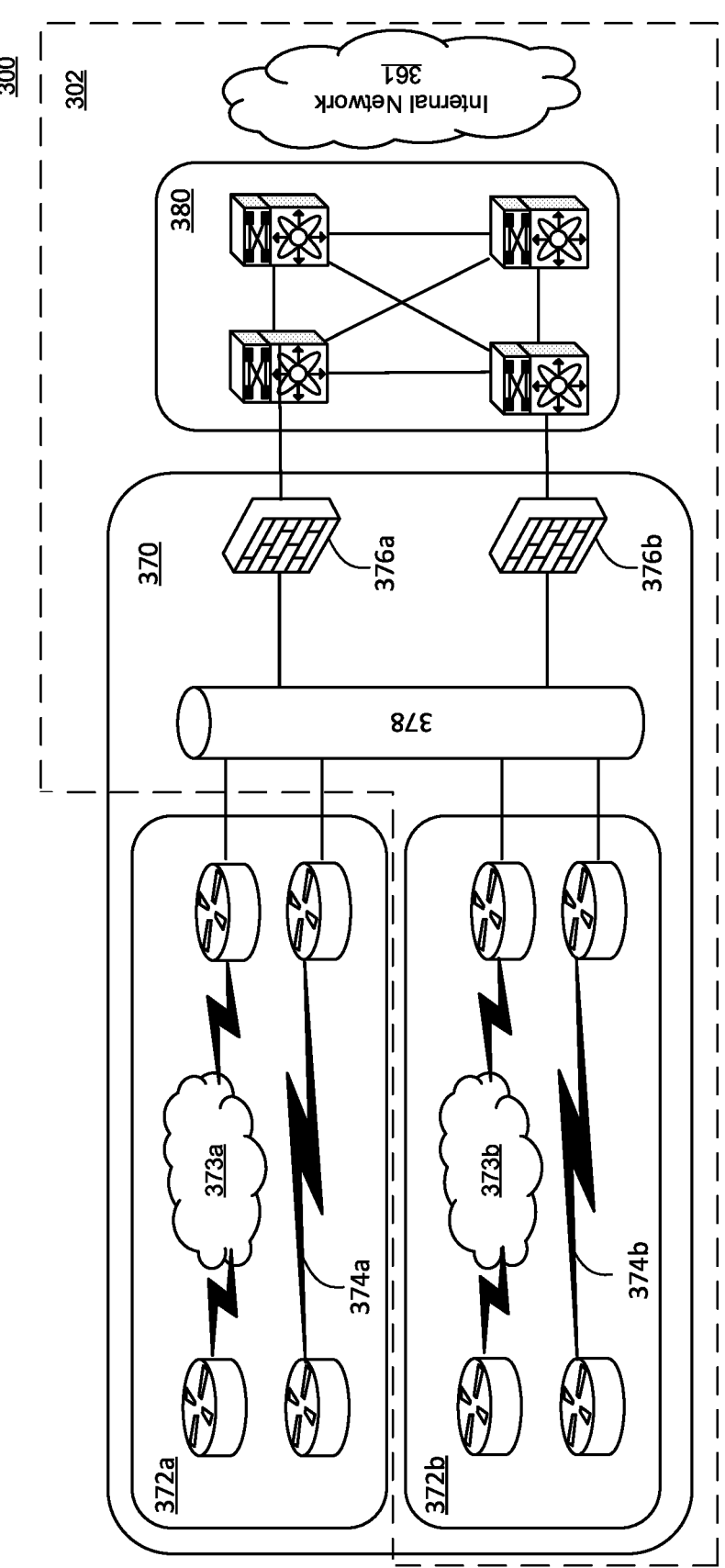
FIG. 3 depicts a second example computing environment, according to some arrangements.

Referring generally to FIGS. 3-4, diagrams of computing environments 300 and 400, including examples of monitoring systems 302 and 402, are shown, according to some arrangements. For example, the monitoring systems 302, 402 can enable monitoring of data transmission anomalies related to activity on or by external devices (e.g., the external computing system 403). More specifically, the monitoring systems 302, 402 can enable various entities (such as the organization device) that control or own the monitoring systems 302, 402 to engage in third party activity data monitoring. For example, third party activity data pertains to various user-driven events on monitored systems/devices and, accordingly, generating and transmitting third party activity data via the monitoring system 302, 402 is an event-driven process. Examples of events may include user-initiated events, such as sending an email or uploading a file, and system-initiated events, such as an automatic call to an executable that resides on the organization's web server. The data is static rather than event-driven, and events may be used to capture this additional static data. For instance, the systems described herein may detect that otherwise authorized activity on an organization's extranet (e.g., the extranet controlled by the institution that controls or owns the monitoring system 302, 402) is performed by an unauthorized (e.g., unknown, previously unregistered) device of the external computing system 403.

For example, a third party entity, for example, external computing system 403 (e.g., 403a, 403b) can be a statement printing vendor of a financial institution that has access to the financial institution's internal network 361, 461 (that can be, for example, intranet). In one arrangement, a third party entity 403 could be a credit scoring data vendor of a financial institution. In one arrangement, a third party entity 403 can be a technology vendor of a financial institution. In an arrangement, a third party entity 403 can be an individual employee of a vendor or cooperating organization of a financial institution (e.g., any user outside of the financial institution with access to the internal network 361, 461). The third party entity 403 may be an unknown entity. In such scenarios, the systems, methods, and non-transitory computer-readable media described herein may be operable to identify a new, unknown entity, log the appropriate entity identifier(s) (e.g., the unique identifiers, such as, for example, domain identifier, subdomain identifier, email address, file name, IP address, etc.) and initiate periodic monitoring of third party activity associated with the new entity. The external computing systems 403 (e.g., 403a, 403b) may access shared network resources of a company or organization (e.g., provided by the institution controlling the monitoring system 302, 402) in which entity data may be stored, such as proxy server, an email server, an extranet, a firewall 476 (e.g., 476a, 476b), or an endpoint that provides security-controlled application or services (such as web services) to a third party 403. For example, the institution controlling the monitoring system 302, 402 may provide an extranet to a particular third party entity, e.g., a vendor. The extranet may be accessible by third party entity users and may include security-controller applications, such as email. In an arrangement, the provider institution may provide a security controlled endpoint (e.g., a URL) that allows a particular third party to access a web-based application, download data files, upload data files, configure API functionality to invoke computer-executable code packages provided or maintained by the institution, etc.

Referring now to the components of FIG. 3 in more detail, the computing environment 300 is shown to include various components of a monitoring system 302. FIG. 3 provides a more detailed view of certain components of the monitoring system 302, according to an arrangement of the present disclosure. The monitoring system 302 may be identical to or similar in some respect to the monitoring system 102 of FIG. 1. Accordingly, like features may be designated with like reference numerals, with the leading digits incremented to "3". Relevant disclosure set forth above regarding similarly identified features thus may not be repeated hereafter. Moreover, specific features of the monitoring system 302 may not be shown or identified by a reference numeral in the drawings or specifically discussed in the written description that follows. However, such features may clearly be the same, or substantially the same, as features depicted in some implementations or described with respect to such implementations. Accordingly, the relevant descriptions of such features apply equally to the features of the monitoring system 302. Any suitable combination of the features and variations of the same described with respect to the monitoring system 102 can be employed with the monitoring system 302, and vice versa. This pattern of disclosure applies equally to further arrangements depicted in subsequent figures and described hereafter.

The monitoring system 302 can include at least one or more of hardware, software and circuitry that originates, generates and routes third party activity data for a particular monitored device to the anomaly identification engine 140, which then performs operations related to detecting third party anomaly activity and provides the output of these operations to the monitoring system 302. The monitoring system 302 may further include an extranet zone 370 having a flexible workflow authorization model (FWAM). The monitoring system 302 can include at least one of a proxy server, an email server, an endpoint, a network server, an extranet server, and a firewall server 376 (e.g., 376a and 376b). The FWAM extranet zone 370 may further include a network switch 378. The monitoring system 302 can include an FWAM border 380 that operatively and communicatively couples the FWAM extranet zone 370 and an internal network 361. The FWAM border 380 can include one or more routers. In operation, these components can provide various connectivity data to the monitoring system 302 through the processes as further described herein with reference to FIG. 4.

The computing system 300 can include one or more connectivity device (e.g., frame relay, optical circuits, ATM circuits, DSL, and cable modems) that operably and communicatively couple the monitoring system 302 to the external computing system 403 (FIG. 4), e.g., a third party service provider location through a network circuit or through an internet connection. For example, extranets can be network connections to the third party entities external to the monitoring system 302. For example, extranet can be a private network controlled by an entity that allows access to the third parties (e.g., at least one or more of partners, vendors and suppliers, and authorized customers). The extranet can be defined by an approved virtual private network (VPN) solution or a private circuit. An extranet network infrastructure (ENI) can be any logical, virtualized or physical computing resource that is used for extranet connectivity and that is within the boundaries of the monitoring system 102 owned or managed by the entity that controls the monitoring system 102. This includes virtual or physical computing resources owned by the entity (e.g., the monitoring system 302), or the third party computing resources, e.g., 372a.

The computing environment 300 may include computing resources 372a (that include routers and sites used by a third party) and computing resources 372b (including routers and sites used by the entity controlling the monitoring system 302). The computing resources 372 (e.g., 372a and 372b) can utilize the private circuits. For example, the computing resources 372a and 372b can utilize multiprotocol label switching (MPLS) carrier 373 (e.g., 373a and 373b, respectively). The computing resources 372a and 372b can utilize point-to-point connectivity 374 (e.g., 374a and 374b, respectively). An extranet boundary can include the FWAM extranet zone 370 and a VPN inside the internet services zone (ISZ) that may be used for extranet connectivity to a third party. The extranet services zone 370 (e.g., defined by some or all components of the monitoring system 302 and the computing resources 372a of the third party) is physically separate from the ISZ and does not include VPN. The extranet service application (ESA) can have any type of applications or services that communicate via extranets. For example, a type of the extranet services zone 370 disclosed herein can be employed when a private (e.g., non-Internet) connectivity to an external network is desired.

The computing environment 400 is shown to include various components of the monitoring system 402 and a third party external computing system 403. FIG. 4 provides a more detailed view of certain components of the computing environment 400, according to an arrangement of the present disclosure. The computing environment 400 may be identical to or similar in some respect to the system 100 of FIG. 1. Accordingly, like features may be designated with like reference numerals, with the leading digits incremented to "4". Relevant disclosure set forth above regarding similarly identified features thus may not be repeated hereafter. Moreover, specific features of the computing environment 400 may not be shown or identified by a reference numeral in the drawings or specifically discussed in the written description that follows. However, such features may clearly be the same, or substantially the same, as features depicted in some implementations or described with respect to such implementations. Accordingly, the relevant descriptions of such features apply equally to the features of the computing environment 400. Any suitable combination of the features and variations of the same described with respect to the system 100 can be employed with the computing environment 400, and vice versa. This pattern of disclosure applies equally to further arrangements depicted in subsequent figures and described hereafter.

The computing system 400 may include the external computing systems 403 (e.g., 403a, 403b) that can be operatively and communicatively coupled to the monitoring system 402 to transmit data. The computing system 400 may include an FWAM internet services zone 471, as well as an FWAM border 480 and an internet border 490. The FWAM internet services zone 471 may include third party computing resources 472a, computing resources 472b of the monitoring system 402, a network switch 478, and firewall servers 476 (e.g., 476a through 476b.) The monitoring system 402 and the external computing systems 403 may communicate via internet, for example, via network 401.

The FWAM border 480 and the internet border 490 can include one or more routers to communicatively and operably couple the FWAM internet services zone 471, respectively, with an internal network 461 and external network 401 (the external network 401 is further coupled to the external computing systems 403). Routers used for a VPN tunnel described herein may be based on the Internet Protocol Security (IPsec) encryption. Such routers may be dedicated solely to ISZ of FWAM. For example, routers not solely dedicated to ISZ of FWAM may be utilized, e.g., the routers that are utilized for other purposes besides operations of FWAM.

The proxy server can transmit web or proxy data (e.g., at least one or more of IP address, any item included in the header, footer, and payload of the outbound Web packet data, etc.) of one or more external computing systems 403. The email server can transmit email data (e.g., email control logs, Proofpoint, FireEye, etc.) of one or more external computing systems 403. The endpoint can transmit endpoint data (e.g., Tanium data, SEP data, etc.) of one or more external computing systems 403. The entity device(s) are considered monitored endpoints. The entity device(s) are communicatively coupled to an endpoint. Accordingly, both arrangements are contemplated herein. The network server can transmit network data of one or more external computing systems 403 (e.g., VPN data, access to VPN data such as user information, etc.). The firewall server 476 (e.g., 476a through 476d) can transmit firewall data (e.g., whether an activity was allowed or blocked via a firewall, IPS/IDS data, anomaly identification and tracing data, data collected from the IP network traffic, etc.) of one or more external computing systems 403. The extranet server can transmit extranet data of one or more external computing systems 403. The external computing systems 403 can provide streams of data (e.g., third party activity data) to the monitoring system 402 through API.

Restricted metrics can include, for example, one or more of the following examples. For example, extension of the internal network 361, 461 to a third party service provider location through the use of a network circuit or through an internet connection (e.g., at least one or more of frame relay, optical circuits, ATM circuits, DSL, and cable modems) can provide the third party name(s). Firewall policy can provide, for example, at least one or more of application name(s), ID(s), application type(s) (e.g., data transfer, HTTP, etc.), hosting party (e.g., server or data hosts, for example, at least one or more of vendor and the organization that controls the monitoring system 302, 402), and internal connections of the organization that controls the monitoring system 302, 402 (e.g., computing systems, server name(s) of data management capability assessment model (DCAM)). For example, line of business (LOB) applications can provide hosting party information or application type(s). For example, payment processing systems can provide information about hosting party or the line of business (for example, Wealth and Investment Management (WIM) or community banking) of the organization that controls the monitoring system 302, 402. For example, a cybersecurity platform can also provide information about the line of business of the organization that controls the monitoring system 302, 402. For example, infrastructure tags can provide information about the line of business of the organization that controls the monitoring system 302, 402.

FIG. 5 depicts a first method of detection of anomalous activity of components of external computing systems, according to some arrangements. Various components of at least one of the computing environments 100, 200, 300, 400 and the monitoring systems 102, 202, 302, 402 in FIGS. 1, 2, 3, 4, respectively, can perform method 500. The method 500 can begin at 510.

At 510, the method can establish a communication interface. For example, the method can establish a communication interface compatible with one or more restricted metrics. For example, the method can establish a communication interface compatible with one or more restricted access points. 510 can include at least one of 512, 514, and 516. At 512, the one or more processing circuits (e.g., circuits in the system 100, 200, 300, 400) can establish interface of the monitoring system 102, 202, 302, 402 compatible with communication protocol of an external computing system (ECS) 103, 403. At 514, the method can establish an interface configured to receive data identifying a transmission by a communication interface with the external computing system 103, 203, 403. At 516, the method can establish a communication interface compatible with a privileged connection having a restricted access. For example, a privileged connection having the restricted access can be a VPN connection. The method 500 can then proceed to 520. The method can include one or more of configuring and establishing the communication interface to be compatible with a privileged connection having a restricted access.

At 520, the method can configure a communication interface. 520 can include at least one of 522 and 524. At 522, the method can configure the interface compatible with a communication protocol. For example, the method can configure the interface to be compatible with a communication protocol including one or more restricted metrics or restricted access points. At 524, the method can configure an interface in response to receiving a parameter from external computing system 103, 203, 403. For example, the parameter can be compatible with a communication protocol including one or more restricted metrics or restricted access points. The method can further include, in response to receiving the parameter from the external computing system, at least one or more of configuring and establishing the communication interface to be compatible with the communication protocol.

Figure 6:
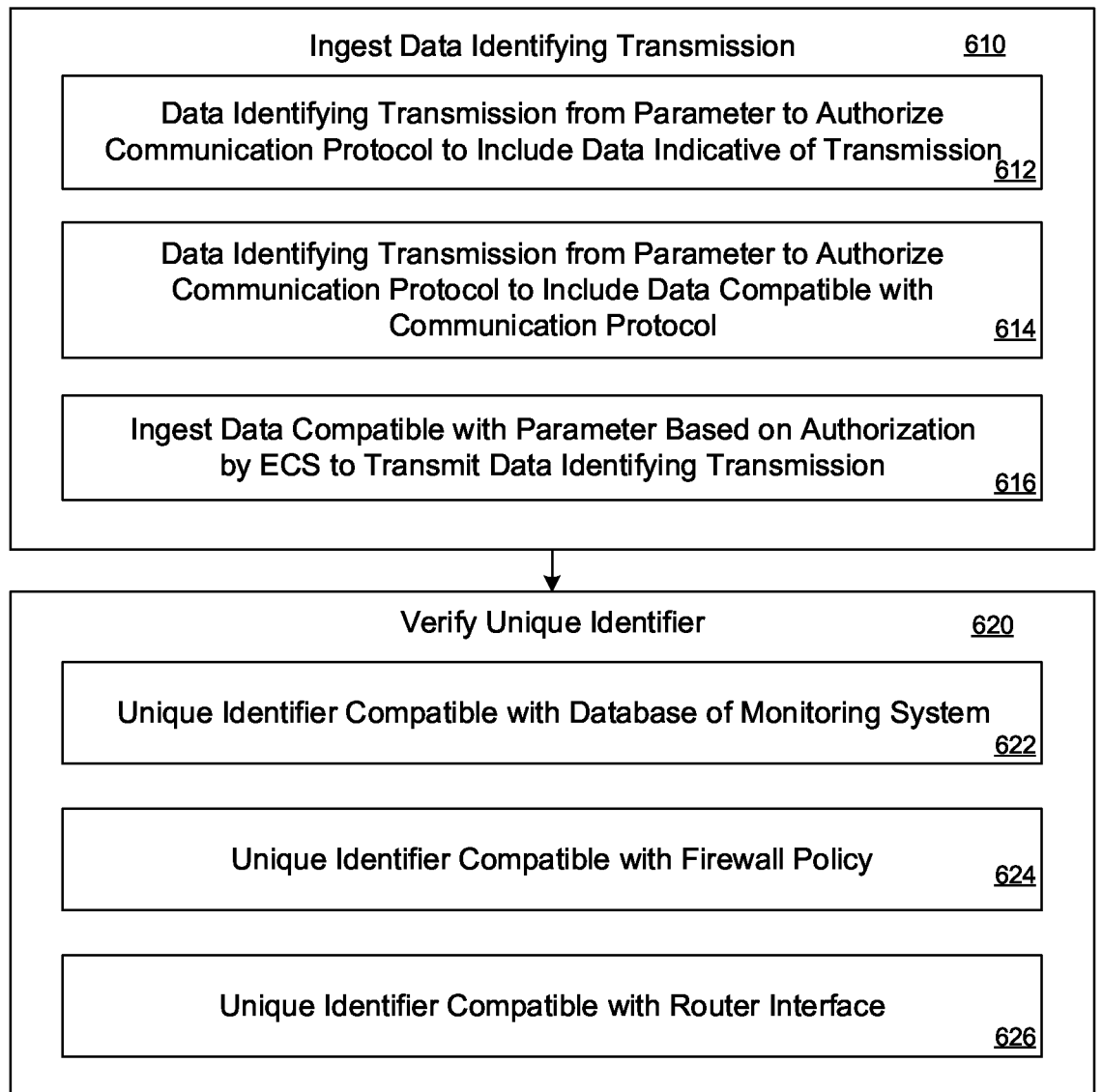
FIG. 6 depicts a second method of detection of anomalous activity of components of external computing systems, according to some arrangements.

FIG. 6 depicts a second method of detection of anomalous activity of components of external computing systems, according to some arrangements. Various components of at least one of the system 100 and the computing environments 200, 300, 400 and the monitoring systems 102, 202, 302, 402 in FIGS. 1, 2, 3, 4, respectively, can perform method 600. The method 600 can begin at 610.

At 610, the method can ingest the data identifying the transmission. For example, the method can receive entity information form a source (e.g., the external computing system 103). The data may include predetermined parameters pertaining to certain types of entity information. The data may be received via a data repository 150 or a network 103. The method 600 can then continue to 620. The method can further include, in response to authorization by the external computing system to transmit the first data identifying the transmission, ingesting third data compatible with the parameter. 610 can include at least one of 612, 614 and 616. At 612, the method can ingest data identifying a transmission from a parameter to authorize a communication protocol to include data indicative of transmission. At 614, the method can ingest data identifying a transmission based on a parameter to authorize a communication protocol to include data compatible with communication protocol. At 616, the method can ingest data identifying a transmission and compatible with the parameter, based on an authorization by the external computing system to transmit data identifying the transmission. For example, the monitoring system 102, 202, 302, 402 can ingest the data identifying transmission in response to authorization to external computing system 103, 203, 403 to transmit data identifying the transmission.

At 620, the method can verify a unique identifier of the external computing system 103, 203, 403. 620 may include at least one of 622, 624, and 626. At 622, the method can verify that a unique identifier is compatible with a database or data repository 150 of the monitoring system 102, 202, 302, 402. At 624, the method can verify that a unique identifier is compatible with the firewall policy of the monitoring system 102, 202, 302, 402. At 626, the method can verify that a unique identifier is compatible with a router interface of the monitoring system 102, 202, 302, 402.

The method can further include identifying the anomaly state based on data volume predetermined by at least one of a type of at least one of the transmitted first, second, or third data or a service agreement established with an entity managing the external computing system. The method can further include identifying the anomaly state of at least one of the transmitted first, second, or third data based on historical data transmitted between the monitoring system and the external computing system. The method can further include identifying the anomaly state via correlation of at least one of the transmitted first, second, or third data with attributes of the external computing system.

Figure 7:
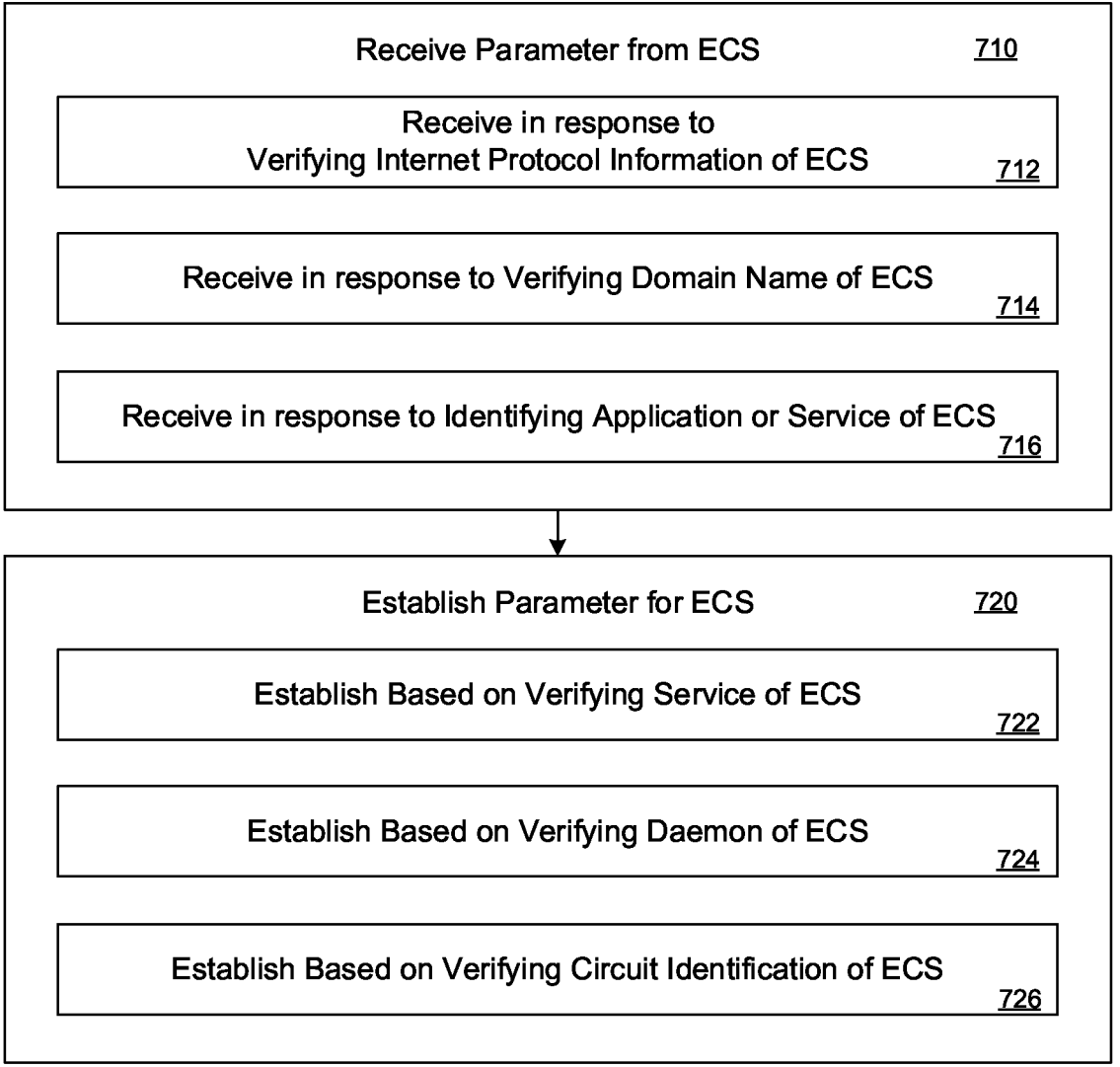
FIG. 7 depicts a third method of detection of anomalous activity of components of external computing systems, according to some arrangements.

FIG. 7 depicts a third method of detection of anomalous activity of components of external computing systems, according to some arrangements. Various components of at least one of the computing environments 100, 200, 300, 400 and the monitoring systems 102, 202, 302, 402 in FIGS. 1, 2, 3, 4, respectively, can perform method 700. The method 700 can begin at 710.

At 710, the method can receive a parameter from an external computing system. 710 can include at least one of 712, 714, and 716. At 712, the method can receive a parameter from an external computing system, in response to verifying Internet protocol information of an external communication system 103, 403. At 714, the method can receive a parameter from an external computing system, in response to verifying a domain name of the external communication system 103, 403. At 716, the method can receive a parameter from an external computing system, in response to identifying an application or service of the external communication system 103, 403. The method 700 can then continue to 720.

At 710, the method can establish a parameter for an external computing system. 720 can include at least one of 722, 724, or 726. At 722, the method can establish the parameter based on verifying a service of the external communication system 103, 403. For example, a service can be based on an activity involving user input or output. At 724, the method can establish a parameter based on verifying a daemon of the external communication system. For example, a daemon can be based on an activity involving input or output of an operating system or operating environment of the external computing system or any component thereof. At 726, the method can establish the parameter based on verifying a circuit identification of the external communication system 103, 403. The method can further include establishing the parameter based on verifying a unique identifier. The unique identifier can include at least one of the internet protocol (IP) information, a domain name, application, service, daemon, or circuit identification (ID) of the external computing system. The unique identifier can be compatible with at least one of a database of the monitoring system, firewall policy, or router interface.

Figure 8:
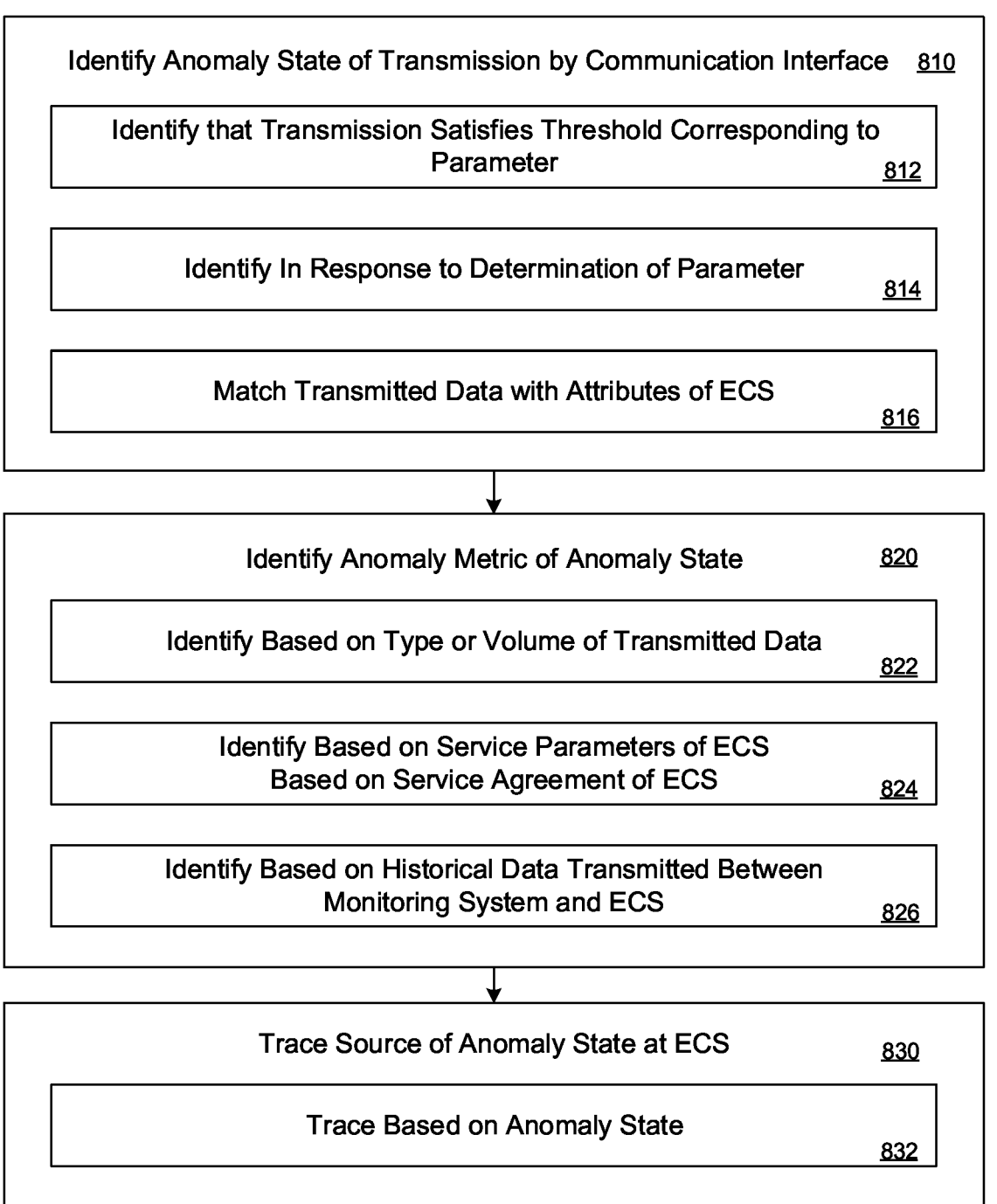
FIG. 8 depicts a fourth method of detection of anomalous activity of components of external computing systems, according to some arrangements.

FIG. 8 depicts a fourth method of detection of anomalous activity of components of external computing systems, according to some arrangements. Various components of at least one of the computing environments 100, 200, 300, 400 and the monitoring systems 102, 202, 302, 402 in FIGS. 1, 2, 3, 4, respectively, can perform method 800. The method 800 can begin at 810.

At 810, the method can identify an anomaly state of a transmission by a communication interface. For example, the method can identify, based on traffic of a communication interface and characteristics of the communication interface, an anomaly state corresponding to a particular external computing system, a particular application of a particular external computing system, a particular service of a particular external computing system, or any combination thereof. 810 can include at least one of 812, 814, and 816. At 812, the one or more processing circuits (e.g., circuits in the system 100, 200, 300, 400) can identify an anomaly state of a transmission by a communication interface. For example, the method can identify an anomaly state of a transmission by a communication interface by identifying that the transmission satisfies a threshold corresponding to the parameter. At 814, in response to a determination based on the parameter that the transmission satisfies a threshold corresponding to the parameter, the method can identify an anomaly state of the transmission by the communication interface. At 816, the method can match the transmitted data with attributes of the external computing system 103, 403. The method 800 can then continue to 820.

At 810, the method can identify an anomaly metric of the anomaly state. 820 can include at least one of 822, 824, and 826. At 822, the method can identify an anomaly metric of the anomaly state based on a type or volume of the transmitted data. At 824, the method can identify the anomaly metric of the anomaly state based on one or more service parameters of an external computing system that correspond to a service agreement established with an entity managing the external computing system 103, 203, 403. At 826, the method can identify the anomaly metric of the anomaly state based on historical data transmitted between the monitoring system 102, 202, 302, 402 and the external computing system 103, 203, 403. The anomaly determination may be based on the data volume, data type, or other data characteristics corresponding to a service agreement between the third party and the institution controlling the monitoring system 102. The method 800 can then continue to 830.

At 830, the method can trace a source of the anomaly state at the external computing system 103, 203, 403. 830 can include 832. At 832 the method can trace the source of the anomaly state of the external computing system based on the anomaly state. For example, the method can identity, based on one or more anomaly metrics of the anomaly state, a particular application, service, daemon, or any combination thereof associated with the anomaly state. For example, an anomaly state can correspond to a presence of unauthorized transmission activity or volume. For example, an anomaly metric can correspond to a particular bitrate or volume of transmission activity from a particular external computing system or component thereof.

Referring to method 800 in more detail, one or more processing circuits (e.g., system processor 112, I/O controller 110, and others) of FIG. 1 perform computer-based operations to identify anomaly based on evaluating the parameters (e.g., extranet parameters). The one or more processing circuits may update the entity profile of the entity with the parameter calculated for each category. Updating the entity profile may include assigning an urgency alert to the entity profile, wherein the urgency alert indicates that the parameter is at or exceeds a predetermined threshold of anomaly. The anomaly threshold may be automatically adjusted using artificial intelligence as the system learns from the system or provided data. For instance, if it is determined that an event previously thought to be benign (e.g., running a particular access protocol on an open port) creates anomaly posing serious risk (e.g., by determining, via expert data, that new ransomware, virus, etc. exploits the access protocol, poses a predetermined level of risk, is associated with a high relative likelihood of occurrence, etc.), then the artificial intelligence engine may revise the predetermined threshold of anomaly. In some implementations, the predetermined threshold of anomaly may be lowered (e.g., from 10 units to 5 units; from 50% surface area to 10% surface area, etc.) such that the relevant parties are more likely to be alerted.

The one or more processing circuits can generate a notification to a system administrator associated with the institution that owns or controls the monitoring system 102. The notification may be generated in response to a new parameter threshold being computed, or the notification may be generated if the anomaly identification engine 140 indicates a predetermined level of urgency or risk associated with the anomaly, allowing for the system administrator to take action responsive to the anomaly. The notification may comprise the parameter or the unique identifier of the entity associated with each anomaly determined by the anomaly identification engine 140. The notification may include a link to the third party entity profile. The notification may be directed to a user device (e.g., mobile device, personal computer, etc.) of the system administrator or may be sent to an electronic mail service that the system administrator may access.

Referring to methods 500 through 800, the one of more processing circuits used to monitor the extranet, for example, to establish the parameter(s) or identify and trace anomalies based on the parameters for each external computing system 103 are part of, or include, an artificial intelligence engine. The artificial intelligence engine may include at least one or more of additional hardware (e.g., circuits, processors, memory, etc.) and software (e.g., inclusive of algorithms) configured to complete artificial intelligence processes, such as machine learning, neural network analysis, deep learning, and the like. The artificial intelligence engine may be trained using a subset of data repository 150 and provided data (e.g., data reflective of a particular period, such as a day, week, month, etc.) and may adjust the parameter(s), anomaly identification, and tracing methods based on collecting additional data throughout the operation of the system. For instance, as more information becomes available via an updated data feed, the AI engine may assign higher relative parameters thresholds to certain external computing systems 103 determined based on new information extracted from the data repository 150. Adjusting the parameter(s), anomaly identification, and tracing methods by the artificial intelligence engine may be performed in real-time, periodically, or may be responsive to a user inputting a command to reconfigure the parameter(s), anomaly identification, and tracing methods. The artificial intelligence engine updates the parameter(s), anomaly identification, and tracing methods such that they may match the determined trends in cyber-infrastructure without manual reconfiguration.

As used herein, the term "third party entity" can, for example, refer to any individual or company that has access to one or more computer-based system or networks of a person or company. The operation of detecting, managing, and storing third party entity activity data described herein can be based at least in part on a security model that can include entity data associated with an entity. The security data, which may include third party activity data, software metadata, IP traffic data, and the like, can be received from a plurality of data channels and pipelines and can pertain to a plurality of computing devices. In general, entity data can be analyzed to detect at least one or more of cybersecurity vulnerabilities and threats. The entity data may be stored in an entity profile. Generally, third party entity can refer to any entity outside of a person or company, such as a customer, vendor, partner, infrastructure services provider, an unrelated entity (e.g., malicious actor) and the like. As described herein, the third party can refer to an external computing system that may include, for example, components, processes, devices, or any combination thereof, coupled or integrated with an external computing system.

As used herein, a "cyber-incident" may be any incident where a party (e.g., user, individual, institution, company) gains unauthorized access to perform unauthorized actions in a computer network environment. A cyber-incident may result from a cybersecurity vulnerability. In many systems, cybersecurity vulnerabilities (e.g., malware, unpatched security vulnerabilities, expired certificates, hidden backdoor programs, inappropriately used at least one or more of super-user and admin account privileges, inadequate remote access policies, other policies and procedures, at least one or more of type and lack of encryption, at least one or more of type and lack of network segmentation, common injection and parameter manipulation, automated running of scripts, etc.) can go undetected and unaddressed, leading to hacking activities, data breaches, cyberattacks (e.g., phishing attacks, malware attacks, web attacks, and artificial intelligence (AI)-powered attacks), and other detrimental cyber-incidents.

As used herein, the term "dimension" may refer to features of data corresponding to certain predetermined categories. As used herein, the term "risk" or "level of risk" can refer to the possibility of cybersecurity danger (e.g., breaches, compromises, etc.). Risk may be quantified according to a variety of factors such as recency of cyber-incidents, a percentage of attack surface exposed, number of infections, mismanaged digital certificates, and the like. Risk and level of risk may be directly related to the risk scores and the scoring determinations. As used herein, the term "resource" can refer to a physical or virtualized (for example, in cloud computing environments) computing resource needed to execute computer-based operations. Examples of computing resources may include computing equipment or device (server, router, switch, etc.), storage, memory, executable (application, service, and the like), data file or data set (whether permanently stored or cached), and a combination thereof (for example, a set of computer-executable instructions stored in memory and executed by a processor, computer-readable media having data stored thereon).

As used herein, "routing information" is defined as at least one or more of source and destination information. For instance, For example, packet includes application-layer level routing information. For example, packet includes at least one or more of transport and Internet-link level routing information. For example, packet includes data link-layer routing information. In the arrangement of FIG. 1, each packet also contains a payload (e.g., data carried on behalf of an application) encapsulated with routing information. As described herein, various vulnerabilities may be associated with these various segments of data from particular packets.

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, and sensors. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring.

"Entity information" may include information pertaining to the cybersecurity and cyber infrastructure of an entity and may include an entity identifier (e.g., information used to identify an entity). The entity data may be extracted by a network monitoring tool from inbound or outbound network traffic for a particular entity. The extracted entity information can be cross-referenced against the entity profile to determine further entity-specific information, verify that an entity is already known to the organization, update the entity profile, etc.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In some example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, and quad core processor), microprocessor. In some implementations, the one or more processors may be external to the apparatus, for example the one or more processors may be a remote processor (e.g., a cloud based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., at least one or more of volatile and non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In some implementations, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

In general, one or more processing circuits included in the various systems described herein can include a microprocessor, an application specific integrated circuit (ASIC), a field-programmable gate array (FPGA), or combinations thereof. A memory can include electronic, optical, magnetic, or any other storage or transmission device capable of providing the processor with program instructions stored in the memory. Instructions can include executable code from any suitable computer programming language. The memory may store machine instructions that, when executed by the processing circuit, cause the processing circuit to perform one or more of the operations described herein. The memory may also store parameter data to affect presentation of one or more resources, animated content items, etc. on the computing device. The memory may include a floppy disk, compact disc read-only memory (CD-ROM), digital versatile disc (DVD), magnetic disk, memory chip, read-only memory (ROM), random-access memory (RAM), Electrically Erasable Programmable Read-Only Memory (EEPROM), erasable programmable read only memory (EPROM), flash memory, optical media, or any other suitable memory from which a processor can read instructions. The instructions may include code from any suitable computer programming language.

The operations described in this disclosure can be implemented as operations performed by a specially configured data processing apparatus on data stored on one or more computer-readable storage devices or received from other sources. The terms "data processing system" or "processor" encompass all kinds of apparata, devices, and machines for processing data, including by way of example, a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross platform runtime environment, a virtual machine, or a combination of one or more of them. The apparatus and execution environment can include various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system, such as one or more executable files A computer program can be stored in a portion of a file that holds other programs or data (e.g., one or more scripts stored in a markup language document), in a single file dedicated to the program in question, or in multiple coordinated files (e.g., files that store one or more subsystems, sub-programs, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform actions by operating on input data and generating output.

For example, one or more processing circuits can be configured to load instructions from the main memory (or from data storage) into cache memory. Furthermore, the one or more processing circuits can be configured to load instructions from cache memory into onboard registers and execute instructions from the onboard registers. In some implementations, instructions are encoded in and read from a read-only memory (ROM) or from a firmware memory chip (e.g., storing instructions for a Basic I/O System (BIOS)).

The one or more processing circuits can be connected to the cache memory. However, in some implementations, the cache memory can be integrated into the one or more processing circuits and implemented on the same circuit or chip as the one or more processing circuits. Some implementations include multiple layers or levels of cache memory, each further removed from the one or more processing circuits. Some implementations include multiple processing circuits and coprocessors that augment the one or more processing circuits with support for additional specialized instructions (e.g., a math coprocessor, a floating point coprocessor, and a graphics coprocessor). The coprocessor can be closely connected to the one or more processing circuits. However, the coprocessor is integrated into the one or more processing circuits or implemented on the same circuit or chip as the one or more processing circuits. In some implementations, the coprocessor is further removed from the one or more processing circuits, e.g., connected to a bus.

The computing systems described herein can include clients and servers. A client and server are generally remote from each other and typically interact through a communication network. The relationship of client and server arises by virtue of computer programs running on the respective computers and having a client-server relationship to each other. For example, a server transmits data (e.g., an HTML page) to a client device (e.g., for purposes of displaying data to and receiving user input from a user interacting with the client device). Data generated at the client device (e.g., a result of the user interaction) can be received from the client device at the server.

To provide for interaction with a user, arrangements of the subject matter described in this specification can be carried out using a computer having a display device, e.g., a quantum dot display (QLED), organic light-emitting diode (OLED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile input, or other biometric information. In addition, a computer can interact with a user by electronically transmitting documents to and receiving documents from a device that is used by the user; for example, by electronically transmitting web pages to a web browser on a user's client device in response to requests received from the web browser.

The various computing devices described herein can originate and transmit traffic via the network. For example, "traffic" can generally relate to data communications between the computing devices and one or more components of FIGS. 1-4. Network traffic can be segmented into packets. Each packet is a formatted unit for the data and routing instructions carried via the network. As used herein, the term "packet" may refer to formatted units at various levels of at least one or more of the OSI networking and TCP/IP models, such that the terms "packet", "IP packet", "segment", "datagram", and "frame" may be used interchangeably. As used herein, the term "packet" can be used to denote monitored network traffic generated by a particular device associated with a monitored entity, for example, the external computing system 103. However, one of skill will appreciate that information received and transmitted by the system 100 may also be encoded in packets, such as TCP/IP packets.

An example packet includes a header, a footer, and a payload. For example, packets may also include metadata, which may include further routing information. For example, For example, packets may be routed via a software-defined networking switch, which may include in the packet further information (metadata) containing routing information for the software-defined networking environment. For example, in addition to at least one or more of a payload, application-layer and link-layer in an example packet, may contain at least one or more of a header and footer that may include at least one or more of a source address of the sending host (e.g., a user device), destination address of the target host, a source port, a destination port, a checksum or other error detection and correction information, packet priority, traffic class, and type of service (ToS), packet length, etc. In arrangements where the network comprises one or more virtual local area networks (VLANs), such that, for example, the various computing devices are on different VLANs, the packet may also contain a VLAN identifier.

Any of the foregoing items in the packet can describe, at least in part, activity in a networked environment. For example, at least some of the foregoing items may be included in third party activity data received via a search or discovery engine for Internet-connected devices, as described herein. For example, an IP packet can include at least one or more of a host address (e.g., IP address) and a port number. Third party activity data provided by a search or discovery engine for Internet-connected devices, can likewise include a property populated with an IP address assigned to a particular device and a port number assigned to a particular software application running on the device in addition to including further information. For example, the data packet can include a record showing, e.g., ownership and other aspects of a domain name, transaction processing (TPS) history or inventory, and the like.

Arrangements of the subject matter and the functional operations described in this specification can be carried out using other types of digital electronic circuitry, or in computer software (e.g., application, blockchain, distributed ledger technology) embodied on a tangible medium, firmware, or hardware, including the structures disclosed in this specification and their structural equivalents, or in combinations of one or more of them. Arrangements of the subject matter described in this specification can be implemented as one or more computer programs, e.g., one or more subsystems of computer program instructions, encoded on one or more computer storage medium for execution by, or to control the operation of, the monitoring system 102. Alternatively, or in addition, the program instructions can be encoded on an artificially generated propagated signal, e.g., a machine generated electrical, optical, or electromagnetic signal, that is generated to encode information for transmission to suitable receiver apparatus for execution by the monitoring system 102. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps and decision steps.

The implementations described herein have been described with reference to drawings. The drawings illustrate certain details of specific implementations that implement the systems, method and programs described herein. However, describing the implementations with drawings should not be construed as imposing on the disclosure any limitations that may be present in the drawings.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes and omissions may be made in the design, operating conditions and implementation of the implementations without departing from the scope of the present disclosure as expressed in the appended claims.

What is claimed is:

1. A system for monitoring particular communication interfaces linked with external computing systems, the system comprising:

memory and one or more processors configured to:

establish a communication interface compatible with a communication protocol of an external computing system and configured to receive first data identifying a transmission by the communication interface with the external computing system, wherein the first data is a token identifier that identifies the transmission;

ingest the first data identifying the transmission based on a parameter of the external computing system to authorize the communication protocol to include second data indicative of at least one of a type of the transmission or a time of the transmission and compatible with the communication protocol;

identify, in response to a determination based on the parameter that the transmission satisfies a threshold corresponding to the parameter, an anomaly state of the transmission by the communication interface;

identify an anomaly metric of the anomaly state, the anomaly metric corresponding to a particular bitrate of transmission activity from the external computing system; and trace, based on the anomaly metric, a source of the anomaly state at the external computing system.

2. The system of claim 1, wherein the memory and one or more processors are further configured, in response to receiving the parameter from the external computing system, to configure the communication interface to be compatible with the communication protocol.

3. The system of claim 1, wherein the memory and one or more processors are further configured, in response to authorization by the external computing system to transmit the first data identifying the transmission, to ingest third data compatible with the parameter.

4. The system of claim 1, wherein the one or more processors are further configured to generate a report comprising the transmission activity and remediation actions.

5. The system of claim 1, wherein the parameter is established based on verifying a unique identifier, the unique identifier comprising at least one of internet protocol (IP) information, a domain name, application, service, daemon, or circuit identification (ID) of the external computing system.

6. The system of claim 5, wherein the unique identifier is compatible with at least one of a database of the system, firewall policy, or router interface.

7. The system of claim 1, wherein the anomaly state is based on a type of one or more of the first data and the second data.

8. The system of claim 1, wherein the anomaly state of at least one of the first data or the second data is based on at least one of historical first data or historical second data transmitted between an entity and the external computing system.

9. The system of claim 1, wherein identification of the anomaly state further comprises matching of at least one of the first data or the second data with attributes of the external computing system.

10. A method for monitoring particular communication interfaces linked with external computing systems, the method comprising memory and one or more processors configured to:

establish a communication interface compatible with a communication protocol of an external computing system and configured to receive first data identifying a transmission by the communication interface with the external computing system, wherein the first data is a token identifier that identifies the transmission;

ingest the first data identifying the transmission based on a parameter of the external computing system to authorize the communication protocol to include second data indicative of at least one of a type of the transmission or a time of the transmission and compatible with the communication protocol;

identify, in response to a determination based on the parameter that the transmission satisfies a threshold corresponding to the parameter, an anomaly state of the transmission by the communication interface;

identify an anomaly metric of the anomaly state, the anomaly metric corresponding to a particular bitrate of transmission activity from the external computing system; and trace, based on the anomaly metric, a source of the anomaly state at the external computing system.

11. The method of claim 10, wherein the memory and one or more processors are further configured, in response to receiving the parameter from the external computing system, to configure the communication interface to be compatible with the communication protocol.

12. The method of claim 10, wherein the memory and one or more processors are further configured, in response to authorization by the external computing system to transmit the first data identifying the transmission, to ingest third data compatible with the parameter.

13. The method of claim 10, wherein the communication interface is compatible with a privileged connection having a restricted metric.

14. The method of claim 10, wherein the parameter is established based on verifying a unique identifier, the unique identifier comprising at least one of internet protocol (IP) information, a domain name, application, service, daemon, or circuit identification (ID) of the external computing system.

15. The method of claim 14, wherein the unique identifier is compatible with at least one of a database, firewall policy, or router interface.

16. The method of claim 10, wherein the anomaly state is based on data volume predetermined by at least one of a type of at least one of the first data or the second data, or a service agreement established with an entity managing the external computing system.

17. The method of claim 10, wherein the anomaly state of at least one of the first data or the second data is based on at least one of historical first data or historical second data transmitted between an entity and the external computing system.

18. The method of claim 10, wherein identification of the anomaly state further comprises matching at least one of the first data or the second data with attributes of the external computing system.

19. A non-transitory computer-readable medium including one or more instructions stored thereon and executable by a processor to:

establish a communication interface compatible with a communication protocol of an external computing system and configured to receive first data identifying a transmission by the communication interface with the external computing system, wherein the first data is a token identifier that identifies the transmission;

ingest the first data identifying the transmission based on a parameter of the external computing system to authorize the communication protocol to include second data indicative of at least one of a type of the transmission or a time of the transmission and compatible with the communication protocol;

identify, in response to a determination based on the parameter that the transmission satisfies a threshold corresponding to the parameter, an anomaly state of the transmission by the communication interface;

identify an anomaly metric of the anomaly state, the anomaly metric corresponding to a particular bitrate of transmission activity from the external computing system; and trace, based on the anomaly metric, a source of the anomaly state at the external computing system.

20. The non-transitory computer-readable medium of claim 19, wherein the non-transitory computer-readable medium further includes one or more instructions executable by the processor to:

match at least one of the first data or the second data with attributes of the external computing system.

\* \* \* \* \*